US011481639B2

(12) United States Patent
Shahrzad et al.

(10) Patent No.: US 11,481,639 B2
(45) Date of Patent: Oct. 25, 2022

(54) ENHANCED OPTIMIZATION WITH COMPOSITE OBJECTIVES AND NOVELTY PULSATION

(71) Applicant: Cognizant Technology Solutions U.S. Corp., College Station, TX (US)

(72) Inventors: Hormoz Shahrzad, Dublin, CA (US); Babak Hodjat, Dublin, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 385 days.

(21) Appl. No.: 16/800,208

(22) Filed: Feb. 25, 2020

(65) Prior Publication Data
US 2020/0272908 A1    Aug. 27, 2020

Related U.S. Application Data

(60) Provisional application No. 62/810,475, filed on Feb. 26, 2019.

(51) Int. Cl.
*G06N 3/12* (2006.01)
*G06N 5/04* (2006.01)

(52) U.S. Cl.
CPC .............. *G06N 3/126* (2013.01); *G06N 5/04* (2013.01)

(58) Field of Classification Search
None
See application file for complete search history.

(56) References Cited

U.S. PATENT DOCUMENTS

| 5,140,530 | A  | 8/1992  | Guha et al.    |
| 5,761,381 | A  | 6/1998  | Arci et al.    |
| 5,845,266 | A  | 12/1998 | Lupien et al.  |
| 5,920,848 | A  | 7/1999  | Schutzer et al.|
| 5,930,780 | A  | 7/1999  | Hughes et al.  |
| 6,240,399 | B1 | 5/2001  | Frank et al.   |
| 6,249,783 | B1 | 6/2001  | Crone et al.   |
| 7,013,344 | B2 | 3/2006  | Megiddo        |
| 7,246,075 | B1 | 7/2007  | Testa          |
| 7,370,013 | B1 | 5/2008  | Aziz et al.    |
| 7,444,309 | B2 | 10/2008 | Branke et al.  |
| 8,527,433 | B2 | 9/2013  | Hodjat et al.  |

(Continued)

FOREIGN PATENT DOCUMENTS

| EP | 0762294 A2 | 3/1997 |
| EP | 2422276    | 2/2012 |

(Continued)

OTHER PUBLICATIONS

Lehman, Joel, et al., "Exploiting open-endedness to solve problems through the search for novelty," ALIFE, 2008.

(Continued)

*Primary Examiner* — Brian Whipple
(74) *Attorney, Agent, or Firm* — Dawn-Marie Bey; Bey & Cotropia PLLC

(57) ABSTRACT

The computer system and method herein uses a multi-objective driven evolutionary algorithm that is better able to find optimum solutions to a problem because it balances the use of objectives as composite functions, and relative novelty and diversity in evolutionary optimization. In particular, the system and method herein described herein presents an improved process which introduces novelty pulsation, i.e., a systematic method to alternate between novelty selection and local optimization.

25 Claims, 15 Drawing Sheets

(56) References Cited

U.S. PATENT DOCUMENTS

| | | |
|---|---|---|
| 8,639,545 B2 | 1/2014 | Cases et al. |
| 8,768,811 B2 | 7/2014 | Hodjat et al. |
| 8,909,570 B1 | 12/2014 | Hodjat et al. |
| 8,918,349 B2 | 12/2014 | Hodjat et al. |
| 8,977,581 B1 | 3/2015 | Hodjat et al. |
| 9,002,759 B2 | 4/2015 | Hodjat et al. |
| 9,053,431 B1 | 6/2015 | Commons |
| 9,785,886 B1 | 10/2017 | Andoni |
| 2002/0019844 A1 | 2/2002 | Kurowski et al. |
| 2002/0080169 A1 | 6/2002 | Diederiks |
| 2003/0014379 A1 | 1/2003 | Saias et al. |
| 2003/0158887 A1 | 8/2003 | Megiddo |
| 2004/0143559 A1 | 7/2004 | Ayala |
| 2004/0210545 A1 | 10/2004 | Branke et al. |
| 2004/0254901 A1 | 12/2004 | Bonabeau et al. |
| 2005/0033672 A1 | 2/2005 | Lasry et al. |
| 2005/0136480 A1 | 6/2005 | Bralnnachuri et al. |
| 2005/0187848 A1 | 8/2005 | Bonissone et al. |
| 2005/0197875 A1 | 9/2005 | Kauffman |
| 2005/0198103 A1 | 9/2005 | Ching |
| 2006/0218107 A1 | 9/2006 | Young |
| 2007/0100907 A1 | 5/2007 | Bayer |
| 2007/0143198 A1 | 6/2007 | Brandes et al. |
| 2007/0143759 A1 | 6/2007 | Ozgur et al. |
| 2007/0150435 A1 | 6/2007 | Murakawa et al. |
| 2007/0185990 A1 | 8/2007 | Ono et al. |
| 2008/0071588 A1 | 3/2008 | Eder |
| 2008/0228644 A1 | 9/2008 | Birkestrand et al. |
| 2009/0125370 A1 | 5/2009 | Blondeau et al. |
| 2009/0307638 A1 | 12/2009 | McConaghy |
| 2009/0327178 A1 | 12/2009 | Jacobson |
| 2010/0030720 A1 | 2/2010 | Stephens |
| 2010/0111991 A1 | 5/2010 | Raitano et al. |
| 2010/0182935 A1 | 7/2010 | David |
| 2010/0256795 A1 | 10/2010 | McLaughlin et al. |
| 2010/0257228 A1 | 10/2010 | Staggs et al. |
| 2010/0257605 A1 | 10/2010 | McLaughlin et al. |
| 2010/0274736 A1 | 10/2010 | Hodjat et al. |
| 2010/0274742 A1 | 10/2010 | Hodjat et al. |
| 2010/0293119 A1 | 11/2010 | Ferringer et al. |
| 2011/0161264 A1 | 6/2011 | Cantin |
| 2011/0246834 A1 | 10/2011 | Rajashekara et al. |
| 2012/0239517 A1 | 9/2012 | Blondeau et al. |
| 2012/0239592 A1 | 9/2012 | Esbensen |
| 2012/0313798 A1 | 12/2012 | Markram |
| 2013/0124440 A1 | 5/2013 | Hodjat et al. |
| 2013/0254142 A1 | 9/2013 | Hodjat et al. |
| 2013/0311412 A1 | 11/2013 | Lazar et al. |
| 2014/0006316 A1 | 1/2014 | Hodjat et al. |
| 2014/0011982 A1 | 1/2014 | Marasco et al. |
| 2015/0288573 A1 | 10/2015 | Baughman et al. |
| 2016/0048753 A1 | 2/2016 | Sussillo et al. |
| 2016/0063359 A1 | 3/2016 | Szegedy et al. |
| 2016/0283563 A1 | 9/2016 | Hojat et al. |
| 2016/0329407 A1 | 11/2016 | Takemura |
| 2016/0364522 A1 | 12/2016 | Frey et al. |
| 2017/0060963 A1 | 3/2017 | Whittaker et al. |
| 2017/0109355 A1 | 4/2017 | Li et al. |
| 2017/0148433 A1 | 5/2017 | Catanzaro et al. |
| 2017/0193367 A1 | 7/2017 | Miikkulainen et al. |
| 2017/0213156 A1 | 7/2017 | Hammond et al. |
| 2017/0256254 A1 | 9/2017 | Huang et al. |
| 2017/0323219 A1 | 11/2017 | Shahrzad et al. |
| 2017/0323636 A1 | 11/2017 | Xiao et al. |
| 2018/0053092 A1 | 2/2018 | Hajizadeh |
| 2018/0114115 A1 | 4/2018 | Liang et al. |
| 2018/0114116 A1 | 4/2018 | Liang et al. |
| 2018/0240041 A1 | 8/2018 | Koch et al. |
| 2019/0065954 A1 | 2/2019 | Bittner, Jr. et al. |

FOREIGN PATENT DOCUMENTS

| | | |
|---|---|---|
| EP | 2422278 | 2/2012 |
| JP | 08-110804 | 4/1996 |
| JP | H09114797 | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 | 6/2007 |
| JP | 2007107173 | 8/2007 |
| JP | 2007522547 | 8/2007 |
| JP | 2008129984 | 6/2008 |
| WO | WO 2017/161233 | 9/1917 |
| WO | WO 2018/211138 | 11/1918 |
| WO | WO 2018/213840 | 11/1918 |
| WO | WO 2005/073854 | 8/2005 |
| WO | WO 2010/120440 | 10/2010 |
| WO | WO 2005/127042 | 11/2010 |
| WO | WO 2010/127039 | 11/2010 |

OTHER PUBLICATIONS

U.S. Appl. No. 13/184,307, filed Jul. 15, 2011 entitled "Data Mining Technique with Experience-Layered Gene Pool," 47 pages.

Hodjat, B., et al., "Introducing an Age-Varying Fitness Estimation Function," Genetic Finance, Chapter 5, Genetic Programming Theory and Practice, Springer Science+Business Media New York, Copyright 2013, pp. 59-71.

U.S. Appl. No. 14/595,991—Office Action dated May 10, 2017, 32 pages.

Hodjat et. al., "nPool: Massively Distributed Simultaneous Evolution and Cross-Validation in EC-Star," Sentient Technologies, May 2015, pp. 1-12.

Ai-Haj Baddar, "Finding Better Sorting Networks," Dissertation to Kent State University for PhD, May 2009, 86 pages.

Cuccu, G., et al., "When Novelty is Not Enough," vol. 6624 in Lecture Notes in Computer Science, published in Applications of Evolutionary Computation, Springer-Verlag Berlin Heidelberg, Copyright 2011, pp. 234-243.

Gomes et al., "Devising Effective Novelty Search Algorithms: A Comprehensive Empirical Study," GECCO '15, Madrid, Spain, Jul. 11-15, 2015, ACM (Copyright 2015), 8 pages.

Gomes et al., "Evolution of Swarm Robotics Systems with Novelty Search," published in Swarm Intelligence, vol. 7, Issue 2, ANTS Special Issue, 2013, pp. 115-144.

Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.

Gupta et al., "An Overview of methods maintaining Diversity in Generic Algorithms," International Journal of Emerging Technology and Advanced Engineering, vol. 2, Issue 5, May 2012, pp. 56-60.

Hodjat et al., "Maintenance of a Long Running Distributed Genetic Programming System for Solving Problems Requiring Big Data," Genetic Finance Chap 1, published in Genetic Programming Theory and Practice XI as Chapter 4, 2014, 20 pages.

Kipfer et al., "UberFlow: A GPU-Based Particle Engine," Computer Graphics and Visualization, The Eurographics Association, Copyright 2004, 9 pages.

Krcah et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.

Lehman et al., "Abandoning Objectives: Evolution through the Search for Novelty Alone," Evolutionary Computation journal, (19):2, MIT Press, Copyright 2011, pp. 189-223.

Lehman et al., "Efficiently Evolving Programs through the Search for Novelty," Proceedings of the Genetic and Evolutionary Computation Conference, ACM, New York NY, Copyright 2010, 8 pages.

Lehman et al., "Evolving a Diversity of Creatures through Novelty Search and Local Competition," Proceedings of the Genetic and Evolutionary Computation Conference, ACM, New York, NY, 2011, 8 pages.

Lehman et al., "Extinction Events Can Accelerate Evolution," PLOS One, journal.pone.0132886, Aug. 12, 2015, 16 pages.

(56) References Cited

OTHER PUBLICATIONS

Lehman et al., "Overcoming Deception in Evolution of Cognitive Behaviors," University of Texas at Austin, ACM, Jul. 12-16, 2014, 8 pages.
Lehman et al., "Revising the Evolutionary Computation Abstraction: Minimal Criteria Novelty Search," Proceedings of the Genetic and Evolutionary Computation Conference, GECCO 2010, ACM, 2010, 8 pages.
Mouret et al., "Encouraging Behavioral Diversity in Evolutionary Robotics: An Empirical Study," Massachusetts Institute of Technology, Copyright 2012, Evolutionary Computation 20(1), Spring, 2012, pp. 91-133.
OReilly, U., et al., "EC-Star: A Massive-Scale, HUB and Spoke, Distributed Genetic Programming System," Evolutionary Design and Optimization Group, published in Genetic Programming Theory and Practice X as Chapter 6, published in V as Chap 1, Springer New York, Copyright 2013, 13 pages.
Salge, C., et al., "Empowerment—An Introduction," published in Guided Self-Organization: Inception, Chap 4, University of Hertfordshire, Copyright 2013, pp. 67-114.
Secretan, J., et al., "Picbreeder: A Case Study in Collaborative Evolutionary Exploration of Design Space," Evolutionary Computation journal, MIT Press, Copyright 2011, 30 pages.
Shahrzad, H., et al., "Tackling the Boolean Multiplexer Function Using a Highly Distributed Genetic Programming System," published in Genetic Programming Theory and Practice XII, Springer International Publishing, Copyright 2015, pp. 167-179.
Valsalam, V.K., et al., "Using Symmetry and Evolutionary Search to Minimize Sorting Networks," Journal of Machine Learning Research 14, The University of Texas at Austin, Department of Computer Science, 2013, pp. 303-331.
Wissner-Gross, et al., "Causal Entropic Forces," Physical Review Letters, PRL 110, 168702, American Physical Society, Apr. 19, 2013, 5 pages.
International Search Report and Written Opinion for PCT Application No. PCT/US18/66610, dated Apr. 15, 2019, 8 pp.
U.S. Appl. No. 14/595,991—Response to Office Action dated May 10, 2017, filed Nov. 10, 2017, 29 pages.
U.S. Appl. No. 14/595,991—Final Office Action dated Feb. 27, 2018, 25 pages.
U.S. Appl. No. 14/595,991—Response to Final Office Action dated Feb. 27, 2018, filed Jul. 27, 2018, 41 pages.
U.S. Appl. No. 14/595,991—Response to Final Office Action dated Feb. 27, 2018, filed May 22, 2018, 32 pages.
Stanley et al., Why greatness cannot be planned: the myth of the objective, Genet. Program Evolvable Mach.,m 16:559-561, 2015.
U.S. Appl. No. 13/943,630—Office Action dated May 27, 2015, 42 pages.
U.S. Appl. No. 13/945,630—Final Office Action dated Aug. 4, 2015, 22 pages.
U.S. Appl. No. 13/945,630—Resonse to Office Action dated Mar. 12, 2015 filed Jul. 13, 2015, 9 pages.
U.S. Appl. No. 13/358,381—Amendment After Allowance filed Feb. 13, 2015, 20 pages.
U.S. Appl. No. 13/943,630—Response to Office Action dated May 27, 2015 filed Sep. 23, 2015, 8 pages.
U.S. Appl. No. 14/539,908—Office Action dated Oct. 1, 2015, 33 pages.
U.S. Appl. No. 13/945,630—Response to Final Office Action dated Aug. 4, 2015 filed Nov. 4, 2015, 12 pages.
U.S. Appl. No. 13/945,630—Notice of Allowance dated Nov. 18, 2015, 8 pages.
U.S. Appl. No. 13/943,630—Notice of Allwoance dated Jan. 21, 2016, 28 pages.
U.S. Appl. No. 14/539,908—Response to Office Action dated Oct. 1, 2015 filed Feb. 1, 2016, 18 pages.
Hodjat et al., "Chapter 5: Introducing an Age-Varying Fitness Estimation Function." Genetic Programming Theory and Practice X. Ed. Riolo et al., Springer Apr. 19, 2013, pp. 59-71.
Caruana, R. Multitask learning. In Learning to learn, pp. 95-133. Springer US, 1998, (Year: 1998).
Rennie, Annealed dropout training of deep networks, 2014 IEEE Spoken Language Technology Workshop (SLT) 2014 (Year: 2014).
Loy C.C. Tang X. Zhang Z., Luo P. Facial landmark detection by deep multi-task learning. In Proceedings of ECCV'14, 2014 (Year: 2014).
Dong, D., Wu, H., He, W., Yu, D., and Wang, H. Multi-task learning for multiple language translation. In Proc. of ACL, pp. 1723-1732, 2015 (Year: 2015).
Li, Xiaodong, and Michael f{irley. 'The effects of varying population density in a fine-grained parallel genetic algcrithmi' Evolutionary Computation. 2002. CEC'02. Proceedings of the 2002 Congress on. vol. 2. IEEE. 2002.
Fidelis. Marcos Vinicius, Heitor S. Lopes, and Alex A. Freitas. "Discovering comprehensible classification rules with a genetic algorithm." Evolutionary Computation 2000. Proceedings of the 2000 Congress on. vol. 1. IEEE. 2000.
Dec. 23, 2008 International Search Report and Written Opinion for PCT/US2008/82876, 10 pp.
Nov. 26, 2012 Extended EP SR for EP 08847214, 9 pp.
Jun. 16, 2011 Written Opinion from Singapore Patent Office in related application SG 201003127-6, 9 pp.
Apr. 20, 2012 Exam Report for related application AU 2008323758, 2 pp.
U.S. Appl. No. 14/014,063—Office Action dated May 7, 2014, 19 pages.
JP 2012-508663—Office Action dated Apr. 1, 2014, 6 pages.
JP 2012-508660—Action dated Apr. 1, 2014, 8 pages (with English Translation).
Supplementary European Search Report dated Oct. 12, 2012 in EP 10770288.
Supplementary European Search Report dated Oct. 9, 2012 in EP 10770287.
U.S. Appl. No. 13/895,238—Office Action dated Jan. 2, 2014, 17 pages.
Aug. 1, 2012 Office Action in U.S. Appl. No. 13/443,546, 12 pp.
Jun. 22, 2011 Office Action in U.S. Appl. No. 12/267,287, 16 pp.
Jul. 27, 2012 Final Office Action in U.S. Appl. No. 12/267,287, 14 pp.
AU 2010241594—Examination Report dated Oct. 8, 2013, 3 pages.
AU 2010241597—Examination Report dated Nov. 4, 2013, 4 pages.
U.S. Appl. No. 15/794,913—Non-Provisional Application filed Oct. 26, 2017, 73 pages.
Stanley, Kenneth O., et al., "Real-Time Evolution of Neural Networks in the Nero Video Game," AAAI, vol. 6, 2006, 4 pp.
Scott, E. O., et al., "Understanding Simple Asynchronous Evolutionary Algorithms," Jan. 17-20, 2015, 15 pp.
Kenneth O. Stanley and Risto Miikkulainen, "Evolving Neural Networks Through Augmenting Topologies," Evolutionary Computation, 10(2):99-127, 2002.
International Search Report and Written Opinion for PCT Application No. PCT/US18/64428, dated Mar. 26, 2019, 12 pp.
International Search Report and Written Opinion for Application No. PCT/US2018/064520, dated March 4, 2019, 8 pp.
Xu, et al., "Inference of Genetic Regulatory Networks With Recurrent Neural Network Models Using Particle Swarm Optimization," Missouri University of Science and Technology, Oct. 2017 [retrieved on Feb. 14, 2019], Retrieved from the Internet: http://scholarsmine.mst.edu/cgi/viewcontent.cgi?article=1751&context=ele_comeng_facwork.
N. Garcia-Pedrajas, et al., "Cooperative Coevolution of Artificial Neural Nedtwork Ensembles for Pattern Classification," IEEE Transactions on Evolutionary Computation, vol. 9, No. 3, Jun. 2005, 32 pp.
Snoek, et al., "Scalable Bayesian Optimization Using Deep Neural Networks", 2015, 13 pages.
Fernando et al., "Pathnet: Evolution channels gradient descent in super neural networks," arXiv preprint arXiv:1701.08734 (2017), 16 pages.
Yang et al., "Deep multi-task representation learning: A tensor factorisation approach," arXiv preprint arXiv:1605.06391 (2016), 12 pages.

(56) References Cited

OTHER PUBLICATIONS

Shazeer et al., "Outrageously large neural networks: The sparsely-gated mixture-of-experts layer," arXiv preprint arXiv:1701.06538 (2017), 19 pages.

Misra et al., "Cross-stitch networks for multi-task learning," In Proceedings of the IEEE Conference on Computer Vision and Pattern Recognition, pp. 3994-4003, 2016.

James Bradbury, et al., "Quasi-Recurrent Neural Networks," arXiv:1611.01576v2, Nov. 21, 2016, 11 pp.; Retrieved from the Internet: https://arxiv.org/pdf/1611.01576.pdf?fbclid=IwAR3hreOvBGmJZe54-631X49XedcbsQoDYIRu87BcCHEBf_vMKF8FDKK_7Nw.

Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved from the Internet: https://www.mitpressjounrals.org/doi/pdf/10.1162/tacl_a_00097.

International Search Report and Written Opinion for PCT Application No. PCT/US2019/017175, dated Jun. 5, 2019, 10 pp.

E. Meyerson and R. Miikulainen, "Pseudo-Task Augmentation: From Deep Multitask Learning to Intratask Sharing and Back," ICML, 2018.

J. Z. Liang, et al., "Evolutionary Architecture Search For Deep Multitask Networks," GECCO, 2018.

E. Meyerson and R. Miikkulainen, "Beyond Shared Hierarchies: Deep Multitask Learning Through Soft Layer Ordering," ICLR, 2018.

R. Miikkulainen, et al., "Evolving Deep Neural Networks," arXiv prepring arXiv:1703.00548, 2017.

Bilen, et al., "Integrated Perception with Recurrent Multi-Task Neural Networks," NIPS, 2016, 9 pp.

International Search Report and Written Opinion for PCT App. No. PCT/US19/61198, dated Mar. 11, 2020, 15 pp.

Moriarty, David E., et al., "Forming neural networks through efficient and adaptive coevolution," Evolutionary Computation 5.4, 1997.

Lee, Chi-Ho, et al., "Evolutionary ordered neural network with a linked-list encoding scheme," Proceedings of IEEE International Conference on Evolutionary Computation, IEEE, 1996.

Bredeche, Nicolas, et al., "On-line, on-board evolution of robot controllers," International Conference on Artificial Evolution, Springer, Berlin, Heidelberg, 2009.

Utech, J., et al., "An evolutionary algorithm for drawing directed graphs," Proc. of the Int. Conf. on Imaging Science, Systems and Technology, 1998.

International Preliminary Report on Patentability for PCT App. PCT/US2019/061198, dated Nov. 18, 2020, 24 pp.

Pantridge, et al., "Evolution of Layer Based Neural Networks: Preliminary Report," GECCO '16, pp. 1015-1022, Jul. 2016.

International Search Report and Written Opinion for PCT Application No. PCT/US18/65472, dated Mar. 27, 2019, 8 pp.

U.S. Appl. No. 15/794,913 titled "Cooperative Evolution of Deep Neural Network Structures," filed Oct. 26, 2017.

U.S. Appl. No. 15/915,028, titled "Asynchronous Evaluation Strategy for Evolution of Deep Neural Networks," filed Mar. 3, 2018.

Risto Miikkulainen, "Evolving Multitask Neural Network Structure," The University of Texas at Austin and Sentient Technologies, Inc., Aug. 26, 2013.

Rosenbaum, et al., "Routing Networks: Adaptive Selection of Non-Linear Funcdtions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2.

Bonadiman, et al., "Multitask Learning with Deep Neural Networks for Community Question Answering," In: Cornell University Library/Computer Science/Machine Learning, Feb. 13, 2017 [online] [retrieved on Mar. 15, 2019], Retrieved from the Internet: https://arxiv.org/abs/1702.03706.

Ruder, "An Overview of Multi-Task Learning in Deep Neural Networks," In: Cornell University Library /Computer Science/ Machine Learning, Jun. 15, 2017 [online] [retrieved on Mar. 15, 2019], Retrieved from the Internet: https://arxiv.org/abs/1706.05098.

Gonzalez, et al., "Evolving Loss Functions With Multivariate Taylor Polynomial Parameterizations," Version 1, published arXiv: 2002.00059v1, Jan. 31, 2020.

Gonzalez, et al., "Evolving Loss Functions With Multivariate Taylor Polynomial Parameterization," Version 2, published arXiv: 2002.00059v2), Feb. 10, 2020.

Gonzalez, et al., "Optimizing Loss Functions Through Multivariate Taylor Polynomial Parameterization," Version 3 (published arXiv:2002.00059v3), Jun. 6, 2020.

N. Hansen, et al, "Adapting arbitrary normal mutation distributions in evolution strategies: The covariance matrix adaptation," In Proceedings of IEEE International Conference on Evolutionary Computation, pp. 312-317, IEEE, 1996.

Hansen, et al., "Completely derandomized self-adaptation in evolution strategies," Evolutionary Computation, vol. 9, No. 2. pp, 159-195, 2001.

N. Hansen, et al., "Evaluating the CMA evolution strategy on multimodal test functions," International Conference on Parallel Problem Solving from Nature, Springer, pp. 282-291, 2004.

H. Li, et al., "Visualizing the loss landscape of neural nets," Advances in Neural Information Processing Systems 31, pp. 6389-6399 (Curran Associates, Inc., 2018), arXiv: 1712.09913v3, Nov. 7, 2018.

Liang, et al, "Population-Based Training for Loss Function Optimization," arXiv:2002.04225v1 (Feb. 11, 2020).

"Python vs. R for Artificial Intelligence, Machine Learning, and Data Science," by Scenario or Task by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/python-vs-or-r-artificial-intelligence-ai-machine-learning-data-science-which-use, 27 pp.

Production vs Development Artificial Intelligence and Machine Learning, by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/development-vs-or-production-batch-offline-online-automated-artificial-intelligence-ai-machine-learning, 24 pp.

"Advanced Analytics Packages, Frameworks, and Platforms," by Alex Castrounis of Innoarchitech, published online by O'Reilly Media, Copyright InnoArchiTech LLC 2020 [retrieved Oct. 16, 2020], Retrieved from the Internet: https://www.innoarchitech.com/blog/packages-frameworks-platforms-by-scenaro-task-artificial-intelligence-ai-machine-learning-data-science, 29 pp.

Santiago Gonzalez, "Loss Function Optimization Using Evolutionary Computation and Multivariate Function Approximators, Particularly Multivariate Taylor Expansions," 5 pp., Aug. 22, 2019.

Santiago Gonzalez, et al., "Improved Training Speed, Accuracy, and Data Utilization Through Loss Function Optimization," Version 1, arXiv: 1905.11528v1, dated May 27, 2019.

Santiago Gonzalez, et al., "Improved Training Speed, Accuracy, and Data Utilization Through Loss Function Optimization," Version 2, arXiv: 1905.11528v2, dated Feb. 10, 2020.

Santiago Gonzalez, et al., "Improved Training Speed, Accuracy, and Data Utilization Through Loss Function Optimization," Version 3, arXiv: 1905.11528v3, dated Apr. 27, 2020.

J. T. Barron, "A General and Adaptive Robust Loss Function," arXiv: 1701.03077v6, 2018.

K. Janocha and W. M. Czarnecki, "On Loss Functions for Deep Neural Networks in Classification," arXiv: 1702.05659, 2017.

A. Krizhevsky, et al., "ImageNet Classification With Deep Convolutional Neural Networks," NIPS'12: Proceedings of the 25th International Conference on Neural Information Processing Systems, vol. 1, Dec. 2012, pp. 1097-1105.

"CS 224D: Deep Learning for NLP, Lecture Notes: Part III", 14 pp., Spring, 2016.

"CS 224D: Deep Learning for NLP, Lecture Notes: Part IV", 12 pp., Spring, 2015.

(56) References Cited

OTHER PUBLICATIONS

"CS 224D: Deep Learning for NLP, Lecture Notes: Part V", 6 pp., Spring, 2015.
U.S. Appl. No. 62/468,224, titled "Asynchronous Evaluation Strategy for Evolution of Deep Neural Networks," filed Mar. 7, 2017.
Aditya Rawal and Risto Miikkulainen, "From Nodes to Networks: Evolving Recurrent Neural Networks." GECCO '18, Jul. 15-19, 2018, Kyoto, Japan.
Julian G. Zilly, Rupesh Kumar Srivastava, Jan Koutnik, and Jurgen Schmidhuber, "Recurrent Highway Networks," CoRR abs/1607.03474, 2016 (Arxiv: 1607.03474).
U.S. Appl. No. 62/627,658, titled "From Nodes to Networks: Evolving Recurrent Neural Networks," filed Feb. 7, 2018.
U.S. Appl. No. 62/627,161, titled "From Nodes to Networks: Evolving Recurrent Neural Networks," filed Feb. 6, 2018.
U.S. Appl. No. 62/598,409, titled "Evolving Multitask Neural Network Structure," filed Dec. 13, 2017.
U.S. Appl. No. 13/540,507—Notice of Allowance and Fee(s) Due, dated Oct. 31, 2014, 9 pages.
U.S. Appl. No. 13/540,507—Response filed Oct. 15, 2014, 20 pages.
U.S. Appl. No. 13/358,381—Notice of Allowance and Fee(s) Due, dated Nov. 19, 2014, 5 pages.
U.S. Appl. No. 13/358,381—Response dated Oct. 3, 2014, 21 pages.
U.S. Appl. No. 13/184,307—Response dated Jun. 23, 2014, 32 pages.
U.S. Appl. No. 13/184,307—Response dated Jan. 22, 2014, 19 pages.
Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.
Hornby, G.S., "A Steady-State Version of the Age-Layered Population Stucture EA," Chapter 1 of Genetic Programming Theory and Practice VII, Riolo et al., editors, Springer 2009, 16pp.
Hornby, G.S., "Steady-State ALPS for Real-Valued Problems." GECCO'09, Montreal, Jul. 2009, Assoc. for Computing Machinery, 8pp.
Idesign lab, "ALPS—the Age-Layered Population Structure," UC Santa Cruz web article printed Mar. 17, 2011, 3 pp. (http://idesign.ucsc.edu/projects/alps.html).
Larsmanss, Marco et al.; "A Unified Model for Multi-Objective Evolutonary Algorithms with Elitism"; 2000; IEEE; pp. 46-53.
Ahn, Chang Wook et al.; "Elitism-Based Compact Genetic Algorithms"; 2003; IEEE; Transactions on Evolutonary Computation, vol. 7, No. 4; pp. 367-385.
Gaspar Cunha, A, et al., "A Mult Objective Evolutionary Algorithm Using Neural Networks to Approximate Fitnese Evaluations," Int'l J. Computers, Systems and Signals, 6(1) 2005, pp. 18-36.
Kosorukoff, A. "Using incremental evaluation and adapive choice of operators in a genetic algorithm," Proc. Genetic and Evolutionary Computation Conference, GECCO—Sep. 2002, 7pp.
Nelson, A. "Fitness functions in evolutionary robotics: A survey and analysis," Robotics and Autonomous Systems 57 (Apr. 30, 2009) 345-370.
Bongard, J. C. et al., "Guarding Against Premature Convergence while Accelerating Evolutionary Search", GECCO'10: Proceedings of the 12th annual conference on Genetic and Evolutionary Computation, 8 pages (2010).
Wu, A.S. et al., "An incremental fitness function for partitioning parallel taks," Proc. Genetic and Evolutionary Computation Conf. (Aug. 2001) 8pp.
Whitehead, B.A. "Genetic Evolution of Radial Basis Function Coverage Using Orthogonal Niches," IEEE Transactions on Neural Networks, 7:6, (Nov. 1996) 1525-28.
Bui, L.T. et al., "Local models: An approach to distributed multi-objective optimization," Computational Optimization and Applications, vol. 42, No. 1, Oct. 2007, pp. 105-139.

Castillo, Tapia, et al., "Applications of multi-objective evolutionary algorithms in economics and finance: A survey," Proc. IEEE Congress on Evolutionary Computation, Sep. 2007, pp. 532-539.
Ducheyne, E. et al., "Is Fitness Inheritance Useful for Real-World Applications?" Evolutionary Multi-Criterion Optimization, ser. LNCS 2631, Spring 2003, pp. 31-42.
Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.
Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.
Juille, H. "Evolution of Non-Deterministic Incremental Algorithms as a New Approach for Search in State Spaces," Proc. 6th Int'l Conf. on Genetic Algorithms, 1995, 8pp.
International Search Report dated Jul. 2, 2010 in PCT/US10/32847.
International Search Report dated Jun. 29, 2010 in PCT/US10/32841.
Sacks, J. et al. "Design and Analysis of Computer Experiments," Statistical Science 4:4, 1989, 409-435.
Torresen, J. "A Dynamic Fitness Function Applied to Improve the Generalisation when Evolving a Signal Processing Hardware Architecture," Proc. EvoWorkshops 2002, 267-299 (12 pp).
Bartlett II, J.E. et al., "Organizational Research: Determining Appropriate Sample Size in Survey Research," IT, Learning, and Performance Journal 19(1) Spring 2001, 8pp.
Fitzpatrick, J.M. et al., "Genetic Algorithms in Noisy Environments," Machine Learning 3: 101-120, May 1988.
JP 2010-533295, Office Action dated Apr. 16, 2013, 3 pages.
León C. et al., "Parallel hypervolume-guided hyperheuristic for adapting the multi-objective evolutionary island model," Proc. 3rd Int'l Workshop on Nature Inspired Cooperative Strategies for Optimization Studies in Computational Intelligence, vol. 236, Nov. 2008, pp. 261-272.
López Jaimes A. et al., "MRMOGA: Parallel evolutionary multiobjective optimization using multiple resolutions," Proc. IEEE Congress on Evolutionary Computation, vol. 3, Sep. 2005, pp. 2294-2301.
Davarynejad, M. et al., "A Novel General Framework for Evolutionary Optimization: Adaptive Fuzzy Fitness Granulation," CEC Sep. 2007, 6pp.
Davarynejad, M. "Fuzzy Fitness Granulation in Evolutionary Algorithms for complex optimization," Master of Science Thesis, Ferdowsi Univ. of Mashhad, Jun. 2007, 30pp.
Salami, M. et al., "A fast evaluation strategy for evolutionary algorithms," Applied Soft Computing 2/3F (Jan. 2003) 156-173.
Akbarzadeh-T., M.-R, et al., "Friendship Modeling for Cooperative Co-Evolutionary Fuzzy Systems: A Hybrid GA-GP Algorithm," Proc. 22nd Int'l Conf. of N. American FIPS, Jul. 2003, pp. 61-66.
Mouret, J.B. et al., "Encouraging Behavioral Diversity in Evolutionary Robotics: An Empirical Study," MIT, Evolutionary Computation 20(1):91-133, 2012.
Myers, Raymond H. and Montgomery, Douglas C., Response Surface Methodology: Process and Product Optimization Using Designed Experiments, John Wiley and Sons, Inc., New York, 1995, 12 pages.
Poli, R., et al., "Genetic Programming: An Introductory Tutorial and a Survey of Techniques and Applications," Univ. Essex School of Computer Science and Electronic Engineering Technical Report No. CES-475, Oct. 2007, pp. 1-112.
Georgilakis, P.S. "Genetic Algorithm Model for Profit Maximization of Generating Companies in Deregulated Electricity Markets", Applied Artificial Intelligence, Jul. 2009, 23:6,538-552.
Refaeilzadeh, P. et al., "Cross Validation" entry, Encyclopedia of Database Systems, eds. Özsu and Liu, Springer, 2009, 6pp.
Remde, S. et al. "Evolution of Fitness Functions to Improve Heuristic Performance," LION Dec. 8-10, 2007 II, LNCS 5313 pp. 206-219.
Sakauchi et al., UNIFINE: A Next Generation Financial Solution System of Nihon Unisys Ltd., Technology Review 'UNISYS,' Japan, Nihon Unisys Ltd., Feb. 28, 2006, vol. 25, No. 4, 5 pages.

(56) References Cited

OTHER PUBLICATIONS

Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.

Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/Introduction to E volutionary Algorithms.pdf).

Tanev, I. et al., "Scalable architecture for parallel distributed implementation of genetic programming on network of workstations," J. Systems Architecture, vol. 47, Jul. 2001, pp. 557-572.

U.S. Appl. No. 13/184,307—Office Action dated Oct. 21, 2013, 16 pages.

Hornby, Gregory S.,"The Age-Layered Population Structure (ALPS) Evolutionary Algorithm," ACM; GECCO Jul. 8-12, 2009; 7 pages.

U.S. Appl. No. 13/358,381—Office Action dated Jul. 8, 2014, 18 pages.

Freitas, A., "A review of evolutionary algorithms for data mining." Soft Computing for Knowledge Discovery and Data Mining, Springer US, 2008, pp. 79-111.

U.S. Appl. No. 13/540,507—Office Action dated Sep. 9, 2014, 25 pages.

U.S. Appl. No. 13/184,307—Notice of Allowance dated Aug. 4, 2014, 9 pages.

U.S. Appl. No. 13/184,307—Office Action dated Mar. 21, 2014, 36 pages.

U.S. Appl. No. 13/945,630—Office Action dated Mar. 12, 2015, 18 pages.

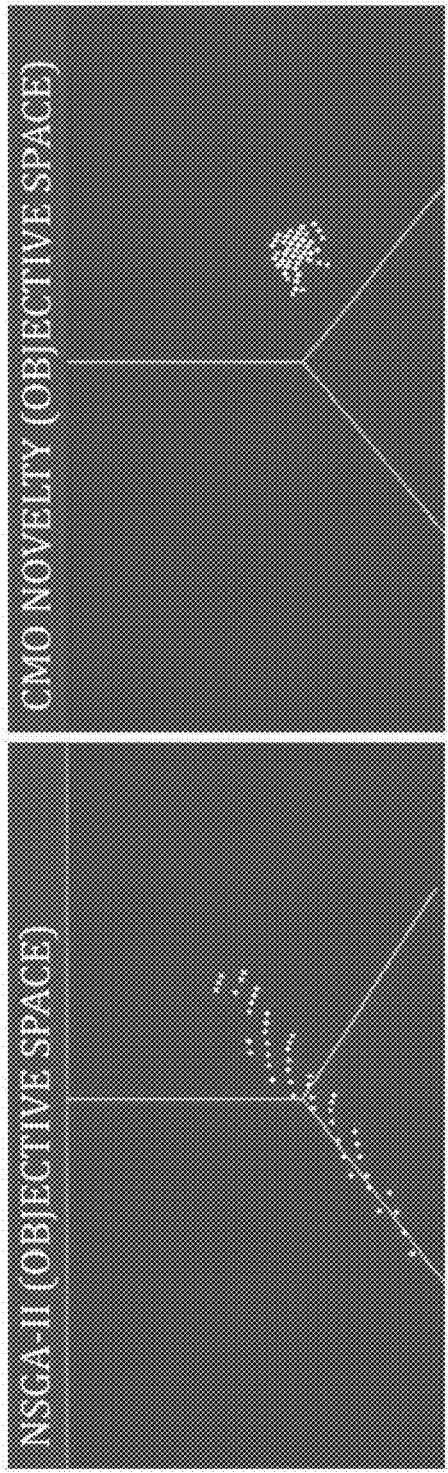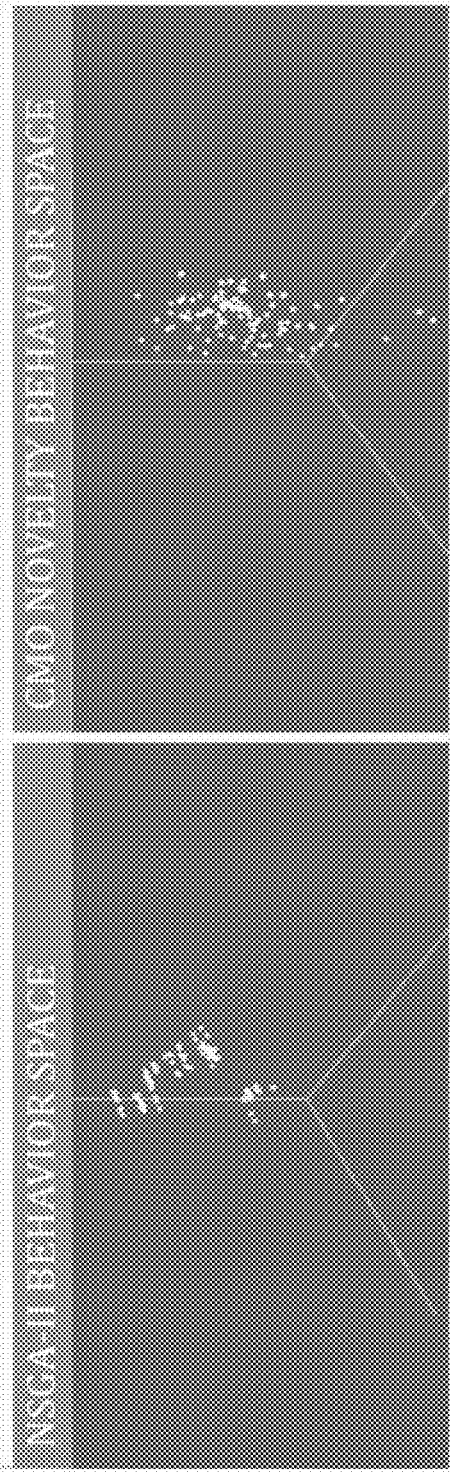
Figure 4a  Figure 4b  Figure 4c  Figure 4d

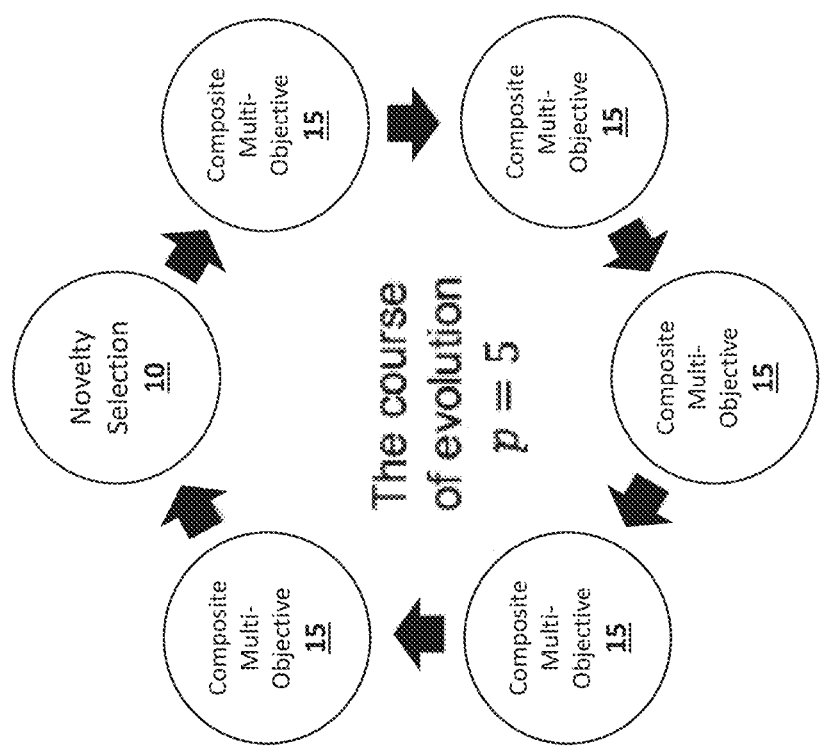

ENHANCED OPTIMIZATION WITH COMPOSITE OBJECTIVES AND NOVELTY PULSATION

CROSS-REFERENCE TO OTHER APPLICATIONS

This application claims the benefit of priority to U.S. Provisional Patent Application No. 62/810,475, similarly entitled "ENHANCED OPTIMIZATION WITH COMPOSITE OBJECTIVES AND NOVELTY PULSATION," filed on Feb. 26, 2019 which is incorporated herein by reference in their entireties.

This application cross-references the following patent applications and publications which are incorporated herein by reference in their entireties: U.S. patent application Ser. No. 16/268,463 entitled "ENHANCED OPTIMIZATION WITH COMPOSITE OBJECTIVES AND NOVELTY SELECTION," filed on Feb. 5, 2019; U.S. Provisional Patent Application No. 62/627,125 entitled "ENHANCED OPTIMIZATION WITH COMPOSITE OBJECTIVES AND NOVELTY SELECTION," filed on Feb. 6, 2018; and U.S. Provisional Patent Application No. 62/658,859 entitled "ENHANCED OPTIMIZATION WITH COMPOSITE OBJECTIVES -ND NOVELTY SELECTION," filed on Apr. 17, 2018.

FIELD OF THE TECHNOLOGY

The technology disclosed relates generally to a computer system that implements improved evolutionary algorithms. More particularly, the computer system uses a multi-objective driven evolutionary algorithm that is better able to find optimum solutions to a problem because it balances the use of objectives as composite functions, and relative novelty and diversity in evolutionary optimization. In particular, the technology discussed herein presents an improved process which introduces novelty pulsation, i.e., a systematic method to alternate between novelty selection and local optimization.

BACKGROUND

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. Despite the large quantities of such data, or perhaps because of it, deriving useful knowledge from such data stores can be a daunting task.

The process of extracting patterns from such data sets is known as data mining. Many techniques have been applied to the problem, but the present discussion concerns a class of techniques known as genetic algorithms. Genetic algorithms have been applied to all of the above-mentioned environments (or domains), as well as numerous others known to those skilled in the art.

Evolutionary algorithms, which are supersets of Genetic Algorithms, are good at traversing chaotic search spaces. According to Koza, J. R., "Genetic Programming: On the Programming of Computers by Means of Natural Selection," MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules among the fittest parent individuals. In each generation, a new population of individuals is created.

A common difficulty of evolutionary algorithms is that they are increasingly faced with environments with multiple problem statements resulting in more than one search objective. For example, in a healthcare embodiment, an individual may have the objective of diagnosing an ailment accurately, and also the objective of a fast diagnosis. To support a multi-objective search, the data mining system may define a number of objectives so as to allow the evolution process to consider more than one objective. For example, in the healthcare embodiment described above with two objectives, the evolution process would search for individuals (solutions) that optimize each of the objectives. A large number of other objectives can be included depending on the target application. In the health care embodiment above, additional objectives, such as consistency, might be included in the multi-objective search space.

The presence of multiple objectives in a data mining environment, in principle, gives rise to a set of optimal solutions instead of a single optimal solution. Such optimal solutions are also known as Pareto-optimal solutions. In the absence of any further information, one of these Pareto-optimal solutions cannot be said to be better than the other.

One way to deal with the problem of multiple objectives is to define a composite function which is a linear combination of all the objectives, weighting each objective according to its perceived importance relative to the other objectives. This technique can work sometimes, but it does not take advantage of the fact that in many environments the objectives are not zero-sum alternatives. It may be possible to find solutions that optimize all objectives in light of each other, even though some objectives may not be satisfied to the same extent as they would if optimized individually.

Single-objective evolutionary algorithms suggest converting the multi-objective optimization problem to a single-objective optimization problem by emphasizing one particular Pareto-optimal solution at a time. When such a method is to be used for finding multiple solutions, it has to be applied many times, hopefully finding a different solution at each simulation run.

Multi-objective evolutionary algorithms (MOEAs) can be used to find solutions in environments with multiple problem statements and more than one search objective. A multi-objective evolutionary algorithm is able to find multiple Pareto-optimal solutions in one single simulation run. One such multi-objective evolutionary algorithm is the non-dominated sorting genetic algorithm (NSGA), described in more detail in an article by Deb, et al., titled "A Fast and Elitist Multiobjective Genetic Algorithm: NSGA II," IEEE Transactions on Evolutionary Computation, Vol. 6, No. 2, pp. 182-197, April, 2002, incorporated herein by reference.

A summary introduction to MOEAs can be found in the article entitled "A Note on Evolutionary Algorithms and Its Applications," by Bhargava in Adults Learning Mathematics: An International Journal, 8(1), 31-45 (2013), the contents of which is incorporated herein by reference and is understood to be known to those skilled in the relevant art. Bhargava also provides a non-exhaustive list of real-world applications for MOEAs, all of which could also benefit from the solutions described herein. Bhargava also stresses that developing MOEAs with properties of convergence as well as a spread of solutions is an imminent challenge.

While multi-objective evolutionary algorithms produce a diverse set of solutions, such diversity may not always be useful. Therefore, a multi-objective driven search is desired that focuses the search in more useful areas of the multi-objective search space. It is in this kind of environment that embodiments of the present invention reside. Focusing the search in more useful areas may result in loss of diversity. As described in U.S. patent application Ser. No. 16/268,463 in an exemplary method for preventing loss of diversity, a relative novelty measure and diversity measure are considered during the selection of optimal individuals in the useful areas of the multi-objective search space. This composite multi-objective novelty method produces a diverse group of individuals in selected areas of a multi-objective search space. This type of diversity enables the method to escape deception and find novel solutions. Novelty selection promotes behavioral diversity (i.e., exploration).

The present embodiments improve upon the composite multi-objective novelty method by introducing the concept of novelty pulsation (also reference herein as Composite Novelty Pulsation) wherein the novelty selection is turned on and off periodically, thereby allowing exploration and exploitation to leverage each other repeatedly. The introduction of Composite Novelty Pulsation produced state-of-the art solutions significantly faster in the tested domains than all prior methodologies. The ability to find optimal solutions more quickly is applicable to myriad of real-world computing applications and domains.

SUMMARY OF EMBODIMENTS

In a first embodiment, a computer-implemented method for finding a solution to a provided problem which optimizes a plurality of objectives and operating a controlled system using the found solution, includes: providing a computer system having a memory storing a candidate pool database identifying a pool of candidate individuals, each identifying a respective candidate solution to the provided problem; testing, by the computer system, individuals from the pool of candidate individuals against a portion of training data to develop a plurality of objective values for each of the tested individuals, each of the objective values estimating the individual's level of success with respect to a corresponding one of the objectives; selecting, by a predefined dominance filter of the computer system, a first subset of individuals from the candidate pool database, the dominance filter being dependent upon a plurality of composite functions of the objectives, each of the composite functions being dependent on at least one of the of objectives and at least one of the composite functions being dependent on more than one of the objectives; procreating, by the computer system, new individuals from a final subset of the individuals in the candidate pool database, the final subset being dependent upon the first subset; inserting the new individuals into the candidate pool database and repeating the steps of testing, selecting and procreating, wherein each iteration of the testing, selecting and procreation is a generation G; further wherein, every P generations, wherein P=G, after the step of selecting a first subset of the individuals, selecting a second subset of individuals from the first subset of individuals, including selecting from the second subset a predetermined number of individuals having greater average behavioral novelty among the individuals in the first subset of individuals, than the average behavioral novelty of all others of the individuals from the first subset, the final subset of individuals being dependent upon the second subset of individuals; and operating a controlled system in dependence upon at least one of the individuals from the candidate pool database.

In a second embodiment, a computer-implemented method for finding one or more optimal solutions to a predetermined problem and operating a controlled system using the one or more found optimal solutions, wherein the one or more optimal solutions addresses a plurality of objectives, includes: testing by a first computer-implemented program each of a plurality of candidate solutions from a predetermined pool of candidate solutions against a portion of training data to develop objective values for the plurality of objectives for each of the tested candidate solutions, each of the plurality of objective values estimating the candidate solution's level of success with respect to a corresponding one of the plurality of objectives; selecting by a second computer-implemented program a first subset of candidate solutions from the candidate pool by application of a dominance filter, wherein a number of candidate solutions in the first subset is a predetermined number; procreating, by a third computer-implemented program, new candidate solutions from a final subset of the candidate solutions in the candidate pool, the final subset being dependent upon the first subset; inserting the new candidate solutions into the candidate pool and repeating the steps of testing, selecting and procreating, wherein each iteration of the testing, selecting and procreation is a generation G; further wherein, every P generations, wherein P=G, after the step of selecting a first subset of the candidate solutions, selecting by a fourth computer-implemented program, a second subset of candidate solutions from the first subset of candidate solutions, based on a novelty comparison, the selecting of the second subset including: re-selecting the first subset of candidate solutions to include an expanded number of candidate solutions in accordance with a multiplier m times the predetermined number, wherein m is greater than 1; determining a novelty score for each of the candidate solutions in the expanded first subset; sorting the candidate solutions in the expanded first subset in descending order of novelty score; selecting a predetermined number of sorted candidate solutions to establish a result set, wherein a candidate solution from the expanded first subset with the highest novelty score is selected first; adding each non-selected, sorted candidate solution from the expanded first subset one at a time to the result set and selecting for removal from the result set a candidate solution having a lowest minimum novelty; and returning a final result set after each non-selected, sorted candidate solution has been iteratively added and compared; and operating a controlled system in dependence upon at least one of the candidate solutions from the candidate pool database.

In a third embodiment, a computer-implemented method for finding a solution to a provided problem in a predetermined domain which optimizes a plurality of objectives and operating a controlled system using the found solution, includes: testing, by a specially programmed system, a set of candidate solutions against a portion of training data for the predetermined domain to develop objective values for each of the tested candidate solutions, each of the objective values estimating the tested candidate solution's level of success with respect to a corresponding one of the objectives; selecting, by a dominance filter of the specially programmed system, a first subset of a predetermined number of candidate solutions from the set, wherein the dominance filter selects candidate solutions using comparisons between composite objective functions of each of the candidate solutions, the composite objective functions including one or more of the estimate objective values; procreating, by the specially programmed system, new candidate solutions from one of the first subset or from a final subset of candidate solutions, the final subset being dependent upon the first subset; inserting the new candidate solutions into the candidate pool and repeating the steps of testing, selecting and procreating, until a predetermined end point is achieved, wherein each iteration of the testing, selecting and procreation is a generation G; further wherein, every P generations, wherein P=G, after the step of selecting a first subset of the candidate solutions, selecting a second subset of candidate solutions from the first subset of candidate solutions, based on a novelty comparison; and operating a controlled system in dependence upon at least one of the candidate solutions from the candidate pool database.

BRIEF SUMMARY OF FIGURES

FIGS. 4a-4d contrast the difference between diversity created by a multi-objective method (FIG. 4a, 4c) and diversity created by novelty searching (FIG. 4b, 4d) in accordance with the sorting network example;

FIG. 5 shows a schematic of the Composite Novelty Pulsation process, wherein, in accordance with a particular example for P (here 5) generations in a row, the algorithm uses Composite Multi-Objective optimization and focuses on improving the objectives;

DETAILED DESCRIPTION

Figure 1:
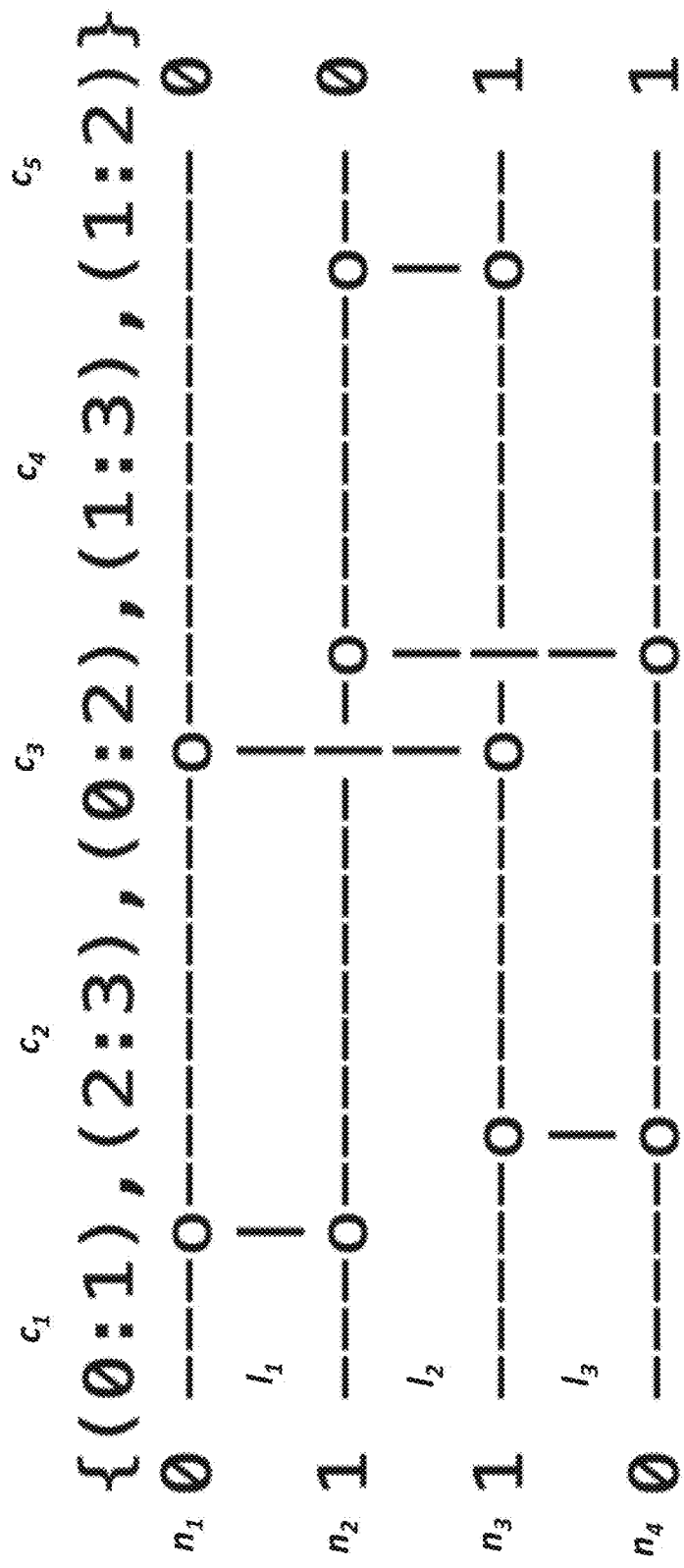
FIG. 1 illustrates an exemplary Four-Input Sorting Network and its representation.

Every search algorithm needs to both explore the search space and exploit the known good solutions in it. Exploration is the process of visiting entirely new regions of a search space, whilst exploitation is the process of visiting regions within the neighborhood of previously visited points. In order to be successful, a search algorithm needs to establish a productive synergy between exploration and exploitation.

A common problem in evolutionary search is that it gets stuck in local minima, i.e. in unproductive exploitation. A common solution is to kick-start the search process in such cases by temporarily increasing mutation rates. This solution can be utilized more systematically by making such kick-starts periodic, resulting in methods such as in delta coding and burst mutation.

The present application introduces an additional improvement to the composite multi-objective novelty method described in commonly assigned U.S. patent application Ser. No. 16/268,463 entitled ENHANCED OPTIMIZATION WITH COMPOSITE OBJECTIVES AND NOVELTY SELECTION (which is incorporated herein by reference in its entirety) by incorporating the kick-start concept into novelty selection with the introduction of the concept of novelty pulsation wherein the novelty selection is turned on and off periodically, i.e., a systematic method to alternate between novelty selection and local optimization, thereby allowing exploration and exploitation to leverage each other repeatedly. Parent selection is a crucial step in an evolutionary algorithm. In almost all such algorithms, whatever method is used for selection remains unchanged during the course of an evolutionary run. However, when a problem is deceptive or prone to overfitting, changing the selection method periodically may make the algorithm more robust. It can be used to alternate the search between exploration and exploitation, and thus find a proper balance between them.

By way of particular example, this concept of novelty pulsation is tested in two domains. First, in the highly deceptive problem of discovering minimal sorting networks, the present approach finds state-of-the-art solutions significantly faster than before. Such networks consist of comparators that map any set of numbers represented in their input lines to a sorted order in their output lines. These networks have to be correct, i.e. sort all possible cases of input. The goal is to discover networks that are as small as possible, i.e. have as few comparators organized in as few sequential layers as possible. While correctness is the primary objective, it is actually not that difficult to achieve because it is not deceptive. Minimality, on the other hand, is highly deceptive and makes the sorting network design an interesting benchmark problem. As described herein, the Composite Novelty Pulsation method has established a new world record for the 20-line sorting network with 91 comparators.

Next, in the real-world problem of stock trading, the goal is to evolve agents that decide whether to buy, hold, or sell particular stocks over time in order to maximize returns. Compared to the original Composite Novelty Selection method without pulsation, Composite Novelty Pulsation finds solutions that generalize significantly better to unseen data. Examples are discussed further herein.

In a preferred embodiment of the Composite Novelty Pulsation method as applied to the minimal sorting network and stock trading domains, novelty selection is switched on and off after a certain number of generations. As in delta-coding and burst mutation, once good solutions are found, they are used as a starting point for exploration. Once exploration has generated sufficient diversity, local optimization is performed to find the best possible versions of these diverse points. These two phases leverage each other, which results in faster convergence and more reliable solutions. A detailed description, with some relevant background, follows below.

Initially, the minimal sorting network problem is addressed using Composite Novelty Pulsation. By way of background, FIG. 1 illustrates an exemplary Four-Input Sorting Network and its representation. This network takes as its input four numbers, $n_1$, $n_2$, $n_3$, $n_4$, (also referred to as lines) and produces output where those number are sorted (small to large, top to bottom). Each comparator (connection between the lines) swaps the numbers on its two lines if they are not in order, otherwise it does nothing. This network has three layers ($l_1$, $l_2$, $l_3$) and five comparators ($c_1$, $c_2$, $c_3$, $c_4$, $c_5$), and is the minimal four-input sorting network. Minimal networks are generally not known for large input sizes. Their design space is deceptive which makes network minimization a challenging optimization problem.

A sorting network of n inputs (lines) is a fixed layout of comparison-exchange operations (comparators, c) that sorts all inputs of size n (see FIG. 1). Since the same layout can sort any input, it represents an oblivious or data-independent sorting algorithm, that is, the layout of comparisons does not depend on the input data. The resulting fixed communication pattern makes sorting networks desirable in parallel implementations of sorting, such as those in graphics processing units, multi-processor computers, and switching networks. Sorting networks are simple to implement in hardware and are useful as switching networks in multiprocessor computers. Beyond validity, the main goal in designing sorting networks is to minimize the number of layers, because it determines how many steps are required in a parallel implementation. A tertiary goal is to minimize the total number of comparators in the networks. Designing such minimal sorting networks is a challenging optimization problem that has been the subject of active research for nearly 70 years. Although the space of possible networks is infinite, it is relatively easy to test whether a particular network is correct: If it sorts all combinations of zeros and ones correctly, it will sort all inputs correctly.

Many of the recent advances in sorting network design are due to evolutionary methods. See, for example, the discussion in V. K. Valsalam, and R. Miikkulainen, USING SYMMETRY AND EVOLUTIONARY SEARCH TO MINIMIZE SORTING NETWORKS, Journal of Machine Learning Research, 14(February):303-331. However, the sorting network domain it is still a challenging problem, even for the most powerful evolutionary methods, because it is highly deceptive. Improving upon a current design may require temporarily growing the network or sorting fewer inputs correctly. Sorting networks are therefore a good domain for testing the power of evolutionary algorithms.

As exemplified in FIG. 1, in order to apply various evolutionary optimization techniques to the sorting network problem, a general structured representation was developed. Sorting networks of n line can be seen as a sequence of two-leg comparators where each leg is connected to a different input line and the first leg is connected to a higher line than the second: $\{(f_1, s_1), (f_2, s_2), (f_3, s_3), \ldots, (f_c, s_c)\}$. The number of layers can be determined from such a sequence by grouping successive comparators together into a layer until the next comparator adds a second connection to one of the lines in the same layer. With this representation, mutation and crossover operators amount to adding and removing a comparator, swapping two comparators, and crossing over the comparator sequences of two parents at a single point. For the purposes of the examples herein, no domain-specific techniques were implemented, but one skilled in the art recognizes that such techniques are known in the art, e.g., designed prefix layers or utilizing symmetries.

When the optimization problem has a smooth and non-deceptive search space, evolutionary optimization of a single objective is usually convenient and effective. However, we are increasingly faced with problems of more than one objective and with a rugged and deceptive search space. The first approach often is to combine the objectives into a single composite calculation:

$$\text{Composite}(O_1, O_2, \ldots, O_k) = \sum_{i=1}^{k} \alpha_i O_i^{\beta_i} \qquad (1)$$

Where the constant hyper-parameters $\alpha_i$ and $\beta_i$ determine the relative importance of each objective in the composition. The composite objective can be parameterized in two ways. First, by folding the objective space, and thereby causing a multitude of solutions to have the same value. Diversity is lost since solutions with different behavior are considered to be equal. Second, by creating a hierarchy in the objective space, and thereby causing some objectives to have more impact than many of the other objectives combined. The search will thus optimize the most important objectives first, which in deceptive domains might result in inefficient search or premature convergence to local optima.

In the sorting network problem, correctness is part of the definition of a sorting network; even if a network mishandles only one sample, it will not be useful. The number of layers can be considered the most important size objective because it determines the efficiency of a parallel implementation. Thus, in accordance with the single objective optimization process, the sorting network problem's hierarchical composite objective can therefore be defined as:

$$\text{SingleFitness}(m,l,c) = 10000m + 100l + c \qquad (2)$$

Where m, l, and c are the number of mistakes (unsorted samples), number of layers, and number of comparators, respectively. In the examples described herein for the purposes of explaining Composite Novelty Pulsation, the solutions will be limited to less than one hundred layers and comparators, and therefore, the fitness will be completely hierarchical (i.e. there is no folding). But the sorting network domain is susceptible to deception, accordingly, we next turn to multi-objective optimization.

Multi-objective optimization methods construct a Pareto set of solutions, and therefore eliminate the issues with objective folding and hierarchy noted with respect to the single objective optimization. However, not all diversity in the Pareto space is useful. Candidates that optimize one objective only and ignore the others are less likely to lead to useful tradeoffs, and are less likely to escape deception. One potential solution is reference-point based multi-objective methods such as NSGA-III described in K. Deb, et al., AN EVOLUTIONARY MANY-OBJECTIVE OPTIMIZATION ALGORITHM USING REFERENCE-POINT-BASED NONDOMINATED SORTING APPROACH, PART I: SOLVING PROBLEMS WITH BOX CONSTRAINTS, IEEE Transactions on Evolutionary Computation, vol. 18, no. 4, 577-601 (2014) and K. Deb, et al., MULTI-OBJECTIVE OPTIMIZATION. IN DECISION SCIENCES: THEORY AND PRACTICE, 145-184 (2016), the contents of which are known to those skilled in the art and which are incorporated herein by reference in their entireties. These methods make it possible to harvest the tradeoffs between many objectives and can therefore be used to select for useful diversity as well, although they are not as clearly suited for escaping deception.

Another problem with purely multi-objective search is crowding. In crowding, objectives that are easier to explore end up with disproportionately dense representation on the Pareto front. NSGA II addresses this problem by using the concept of crowding distance, and NSGA III improves upon it using reference points. NSGA II is described in K. Deb, A. et al., A FAST AND ELITIST MULTIOBJECTIVE GENETIC ALGORITHM: NSGA-II, IEEE Trans. on Evolutionary Computation 6, 2 (2002), 182-197, which is known to those skilled in the art and the contents of which is incorporated herein by reference. These methods, while increasing diversity in the fitness space, do not necessarily result in diversity in the behavior space.

An alternative method is to use composite multi-objective axes to focus the search on the area with most useful tradeoffs. Since the axes are not orthogonal, solutions that optimize only one objective will not be on the Pareto front. The focus effect, i.e., the angle between the objectives, can be tuned by varying the coefficients of the composite. However, focusing the search in this manner has the inevitable side effect of reducing diversity. Therefore, it is important that the search method makes use of whatever diversity exists in the focused space. One way to achieve this goal is to incorporate a preference for novelty into selection.

With respect to the sorting network problem, like the single objective approach to optimization, in the multi-objective approach, the same dimensions, i.e. the number of mistakes, layers, and comparators m, l, c, are used as three separate objectives. In the exemplary embodiment herein, these objectives are optimized by the NSGA-II algorithm with selection percentage set to 10%. Indeed, this approach may discover solutions with just a single layer, or a single comparator since they qualify for the Pareto front. Therefore, diversity is increased compared to the single-objective method, but this diversity is not necessarily helpful.

In order to construct composite axes, each objective is augmented with sensitivity to the other objectives:

$$\text{Composite1 } (m,l,c) = 10000m + 100l + c \qquad (3)$$

$$\text{Composite2 } (m,l) = \alpha_1 m + \alpha_2 l \qquad (4)$$

$$\text{Composite3 } (m,c) = \alpha_3 m + \alpha_4 c \qquad (5)$$

The primary composite objective (Equation 3), which will replace the mistake axis, is the same hierarchical fitness used in the single-objective approach. It discourages evolution from constructing correct networks that are extremely large. The second objective (Equation 4), with $\alpha_2 = 10$; primarily encourages evolution to look for solutions with a small number of layers. A much smaller cost of mistakes, with $\alpha_1 = 1$, helps prevent useless single-layer networks from appearing in the Pareto front. Similarly, the third objective (Equation 5), with $\alpha_3 = 1$ and $\alpha_4 = 10$, applies the same principle to the number of comparators.

The values for $\alpha_1$, $\alpha_2$, $\alpha_3$ and $\alpha_4$ were found to work well in this application, but the approach was found not to be very sensitive to them. A broad range will work as long as they establish a primacy relationship between the objectives.

It might seem like we are adding several hyper-parameters which need to be tuned, but we can estimate them in each domain by picking values that push away trivial or useless solutions off the Pareto front.

Next, a novelty measure is employed to select which individuals to reproduce and which to discard. In this manner, it is integrated into the genetic algorithm itself, and its role is to make sure the focused space defined by the composite multiple objectives is searched thoroughly. In order to measure novelty of the solutions, it is first necessary to characterize their behavior. While such a characterization can be done in many ways, a concise and computationally efficient approach with respect to the sorting network domain, is to count how many swaps took place on each line in sorting all possible zero-one combinations during the validity check. Such a characterization is a vector that has the same size as the problem, making the distance calculations fast. It also represents the true behavior of the network. Even if two networks sort the same input cases correctly, they may do it in different ways, and the characterization is likely to capture that difference. Given this behavior characterization, novelty of a solution is measured by the sum of pairwise distances of its behavior vector and compared to those of all the other individuals in the selection pool:

$$NoveltyScore(x_i) = \sum_{j=1}^{n} d(b(x_i), b(x_j)). \qquad (6)$$

wherein $b(x_i)$ is a function mapping any solution $x_i$ to its behavior $b_{xi}$ and exploration of the behavior space by a search algorithm is facilitated by a function giving the distance between two solutions as a function of their behavior. The behavior distance is $d(b(x_i), b(x_j))$, wherein $x_j$ is the $j^{th}$ nearest neighbor of $x_i$ in the behavior space.

Figure 2:
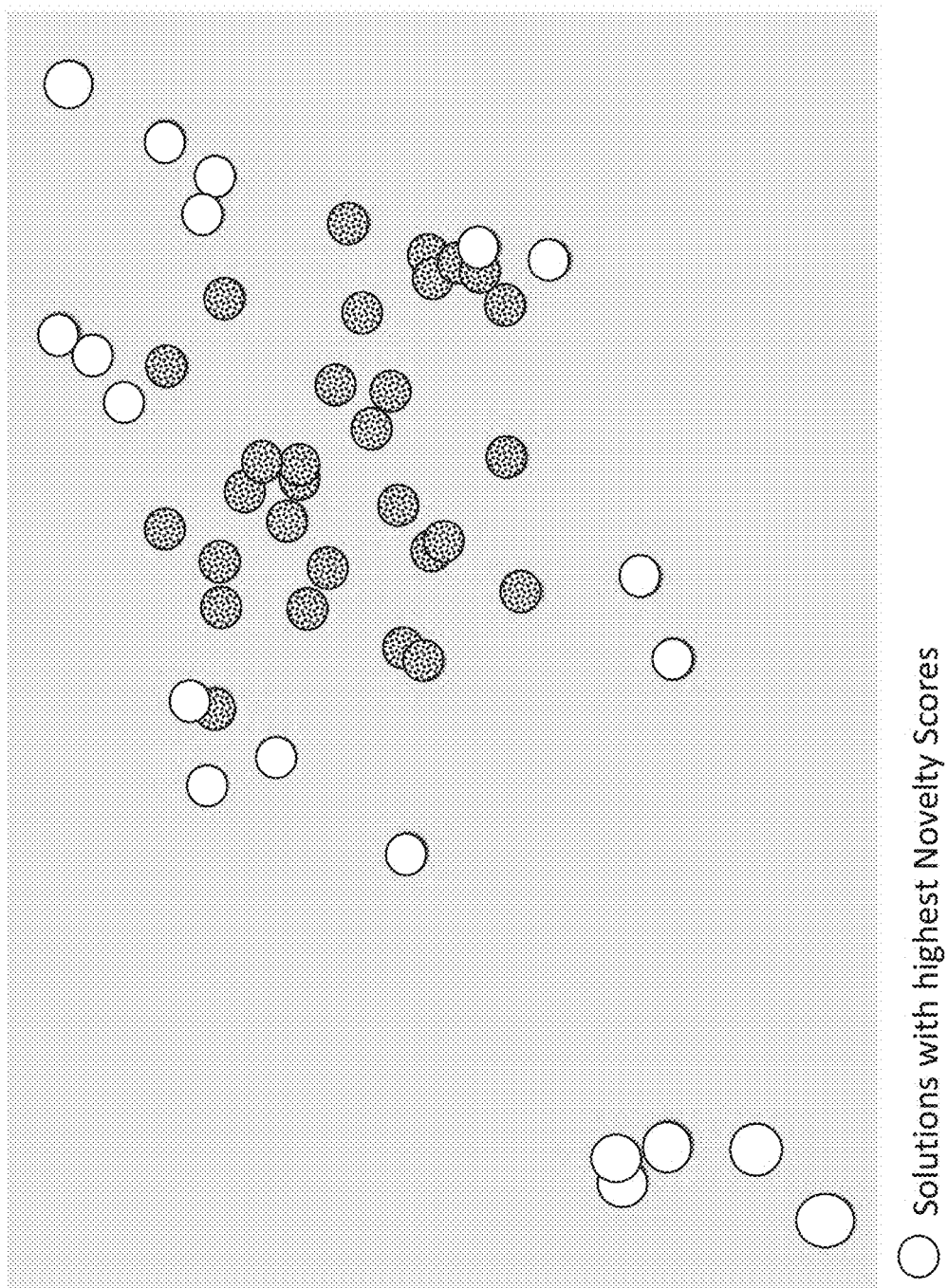
FIG. 2 shows an exemplary result of applying novelty scoring in accordance with the sorting network example.

The selection method also has a parameter called selection multiplier (e.g. set to 2 in these experiments), varying between one and the inverse of the elite fraction (e.g. 1/10, i.e. 10%) used in the NSGA-II multi-objective optimization method. The original selection percentage is multiplied by the selection multiplier to form a broader selection pool. That pool is sorted according to novelty, and the top fraction representing the original selection percentage is used for selection. This way, good solutions that are more novel are included in the pool. FIG. 2 shows an example result of applying Equation 6 in the present sorting network example.

One potential issue is that a cluster of solutions far from the rest may end up having high novelty scores while only one is good enough to keep. Therefore, after the top fraction is selected, the rest of the sorted solutions are added to the selection pool one by one, replacing the solution with the lowest minimum novelty, defined as $$MinimumNovelty(x_i) = \min_{1 \le j \le n; j \ne i} d(b(x_i), b(x_j)). \qquad (7)$$

Figure 3:
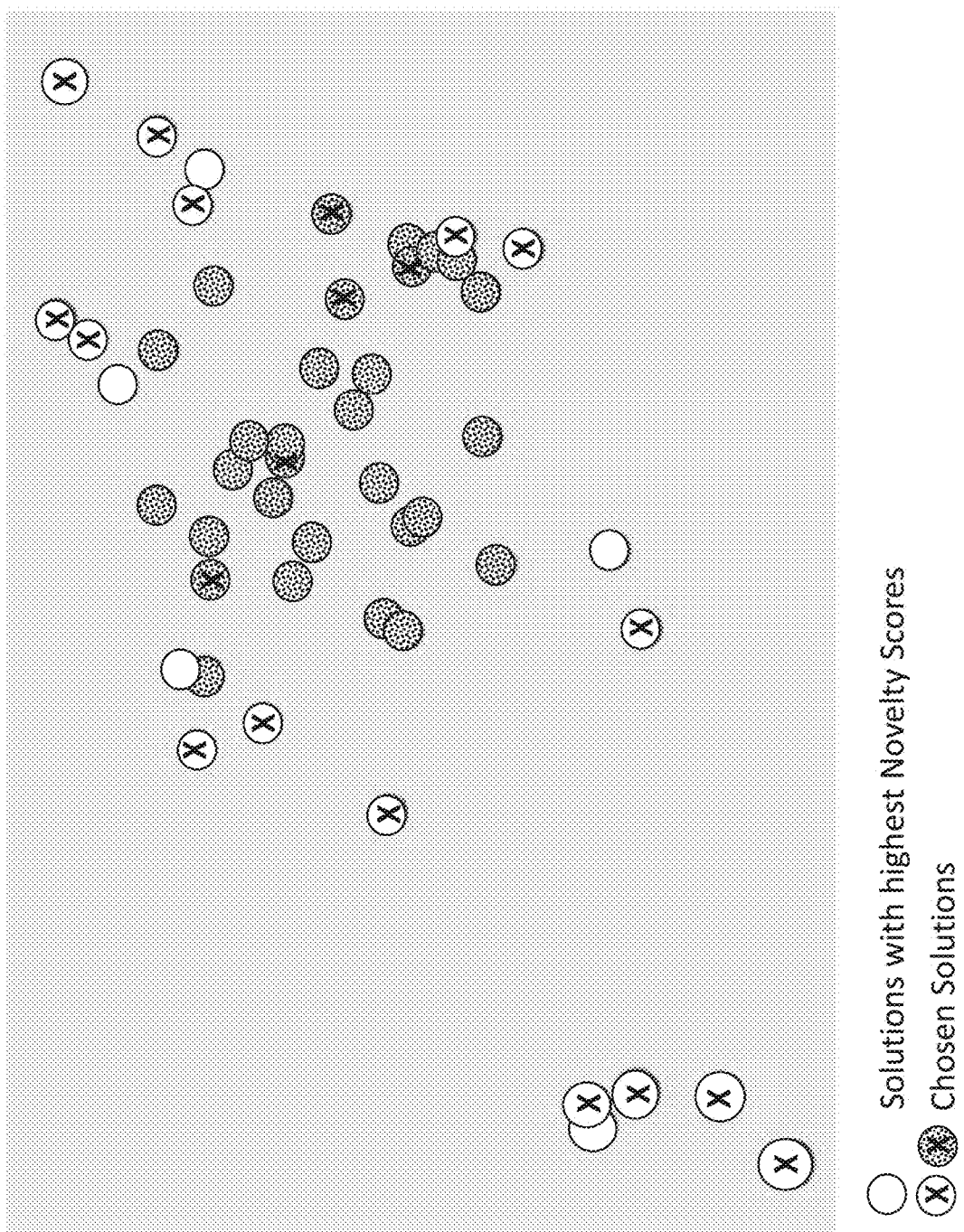
FIG. 3 shows an example result of applying a minimal novelty selection equation in accordance with the sorting network example.

This method facilitates tuning novelty selection continuously between two extremes. By setting selection multiplier to one, the method reduces to the original multi-objective method (i.e. only the elite fraction ends up in the final elitist pool), and setting it to the inverse of the elite fraction reduces it to pure novelty search (i.e. the whole population, sorted by novelty, is the selection pool). In practice, low and midrange values for the multiplier work well, including the value 2 used in these experiments. FIG. 3 shows an example result of applying Equation 7. The entire novelty-selection algorithm is summarized below:

1. using a selection method (e.g. NSGA-II) pick selection multiplier, m, times the number (%) of elitist candidates usually selected in accordance with the selection method, i.e., parent selection rate
2. sort them in descending order according to their NoveltyScore (Equation 6)
3. move the usual number of elitist candidates from the top of the list to the result set
4. for all remaining candidates in the sorted list:
    a. add the candidate to result set
    b. remove the candidate with the lowest MinimumNovelty (Equation 7)
    c. (using a fitness measure as the tie breaker)
5. return the resulting set as the elite set To visualize this process, FIGS. 4a-4d contrast the difference between diversity created by the multi-objective method (e.g. NSGA-II) (FIG. 4a, 4c) and diversity created by novelty searching (FIG. 4b, 4d). In the objective space (FIG. 4a, 4b), novelty looks more focused and less diverse, but in the behavior space (FIG. 4c, 4d) it is much more diverse. This type of diversity enables the method to escape deception and find novel solutions, such as the state of the art in sorting networks.

One skilled in the art appreciates that there are varied approaches proposed in the prior art which may be considered as alternatives for the novelty measure employed to select which individuals to reproduce and which to discard. Many of these approaches combine a fitness objective with a novelty objective in some way, for instance as a weighted sum, or as different objectives in a multi-objective search. Another approach is to keep the novelty and fitness searches separate, and make them interact through time. For instance, it is possible to first create a diverse pool of solutions using novelty search, presumably overcoming deception that way, and then find solutions through fitness-based search. A different approach is to run fitness-based search with a large number of objective functions that span the space of solutions, and use novelty search to encourage the search to utilize all those functions. And yet another approach is to run novelty search as the primary mechanism, and use fitness to select among the solutions. For instance, it is possible to add local competition through fitness to novelty search. Another version is to accept novel solutions only if they satisfy minimal performance criteria.

Parent selection is a crucial step in an evolutionary algorithm. In almost all such known evolutionary algorithms, whatever method is used for parent selection remains unchanged during the evolutionary run. However, when a problem is deceptive or prone to over-fitting, changing the selection method periodically may make the algorithm more robust. It can be used to alternate the search between exploration and exploitation, and thus find a proper balance between them.

In Composite Novelty Pulsation, novelty selection is switched on and off after a certain number of generations. As in delta-coding and burst mutation, once good solutions are found, they are used as a starting point for exploration. Once exploration has generated sufficient diversity, local optimization is performed to find the best possible versions of these diverse points. These two phases leverage each other, which results in faster convergence and more reliable solutions. Composite Novelty Pulsation adds a new hyper-parameter, P, denoting the number of generations before switching novelty selection on and off. Preliminary experiments showed that P=5 works well in both sorting network and stock trading domains; however, in principle, it is possible to tune this parameter to fit the domain. FIG. 5 shows a schematic of the Composite Novelty Pulsation process, wherein, in accordance with the present example, for P (here 5) generations in a row, the algorithm uses Composite Multi-Objective optimization and focuses on improving the objectives.

Referring back to FIGS. 2 and 3, in FIG. 2, in accordance with the Composite Novelty Pulsation process, for every P generations in a row, e.g., P=5 in this example, a Composite Multi-Objective optimization process focuses on improving the objectives which means selecting the solutions as indicated. And then every other P generations, a pulse of Novelty Selection shakes the pool and the solutions are selected as indicated in FIG. 3.

In a preferred embodiment, changing the novelty selection-multiplier needs two multiplier values (m1, m2) and the number P generations, wherein P is the new hyper-parameter called pulsation duration. This way, the evolution shifts between pure multi-objective (multiplier value of one) and pure novelty search (multiplier value of 1/elitist-percentage) every P generations. This embodiment is particularly effective when the pool population is quite small i.e., even under 100 genes. This process may be useful for evolving deep neural networks where a huge pool population is not an option due to the high cost of training/evaluation.

Accordingly, the modification to the composite multi-objective novelty is to add the integer parameter P, wherein during the evolution loop at each generation, we check if the current generation number is divisible by P. If NO, we consider the novelty-selection-multiplier to be $m_1$ ($m_1$=1 is the special case for simple composite multi-objective method with no novelty). And if YES, we consider novelty-selection-multiplier to be $m_2$ ($m_2$>1 will inject some novelty into the composite multi-objective method). A detailed description of the competition process is discussed with reference to FIGS. 13a-13c herein.

The Composite Novelty Pulsation process was tested on the sorting network domain problem in accordance with the experimental parameters in Table 1. Previous work in the sorting networks domain demonstrated that composite novelty can match the minimal known networks up to 18 input line with reasonable computational resources. The goal of the sorting network experiments with Composite Novelty Pulsation is to achieve the same (or better) result faster, i.e., with fewer computational resources. Accordingly, the experiments were standardized to a single machine, i.e. a multi-core desktop.

TABLE 1

| Network Sizes (NS) | 11 (i.e., 8, 9, 10, 11, 12, 13, 14, 15, 16, 17, 18) |
| --- | --- |
| Number of Runs | 10 per NS (220 total runs) |
| Parent Selection Rate | 10% |
| Population Size: Composite Novelty Selection | 1000 |
| Population Size: Composite Novelty Pulsation | 100 |
| Novelty Selection multiplier (m) | 2 |
| Novelty Pulsation (P) | 5:1 (P = 5) |

Figure 6:
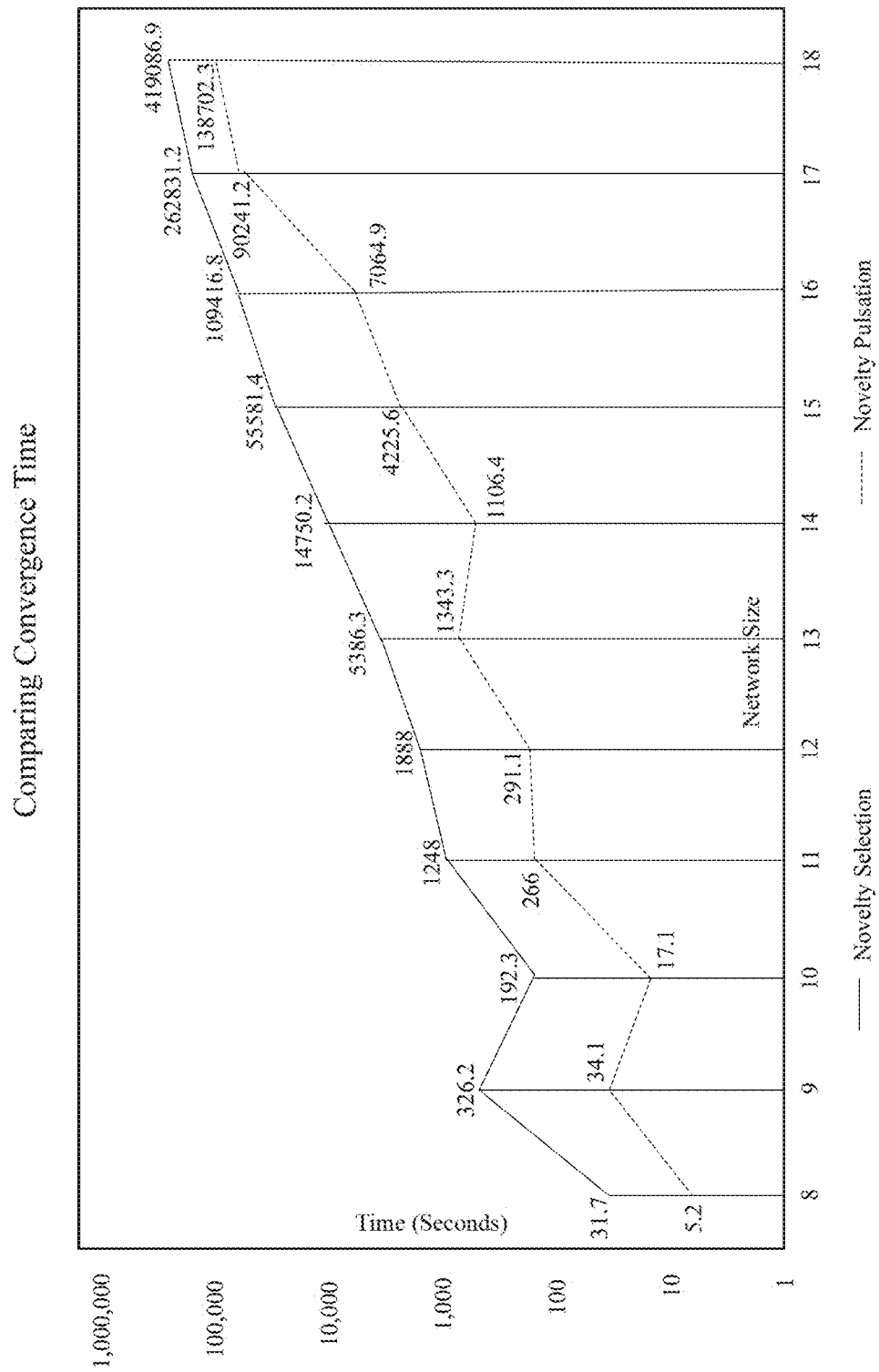
FIG. 6 illustrates a comparison between the Composite Novelty Pulsation process and the Composite Novelty Selection process (alone) time to convergence across different network sizes in accordance with the sorting network problem.

The improvement in speed to solutions is evident in the comparison between the Composite Novelty Pulsation process and the Composite Novelty Selection process (alone)

time to convergence as shown in FIG. 6. In FIG. 6, the average runtime needed to converge to the state of the art on networks with different sizes is significantly faster at all sizes using Composite Novelty Pulsation converges, demonstrating improved balance of exploration and exploitation. In fact, Composite Novelty Pulsation shows an order of magnitude faster convergence across the board. And all runs resulted in state-of-the-art sorting networks. Additionally, Composite Novelty Selection has convergence problems for pool size less than 1000 individuals, whereas Composite Novelty Pulsation convergence is comparatively more consistent if for pool sizes under 100 individuals.

Figure 7:
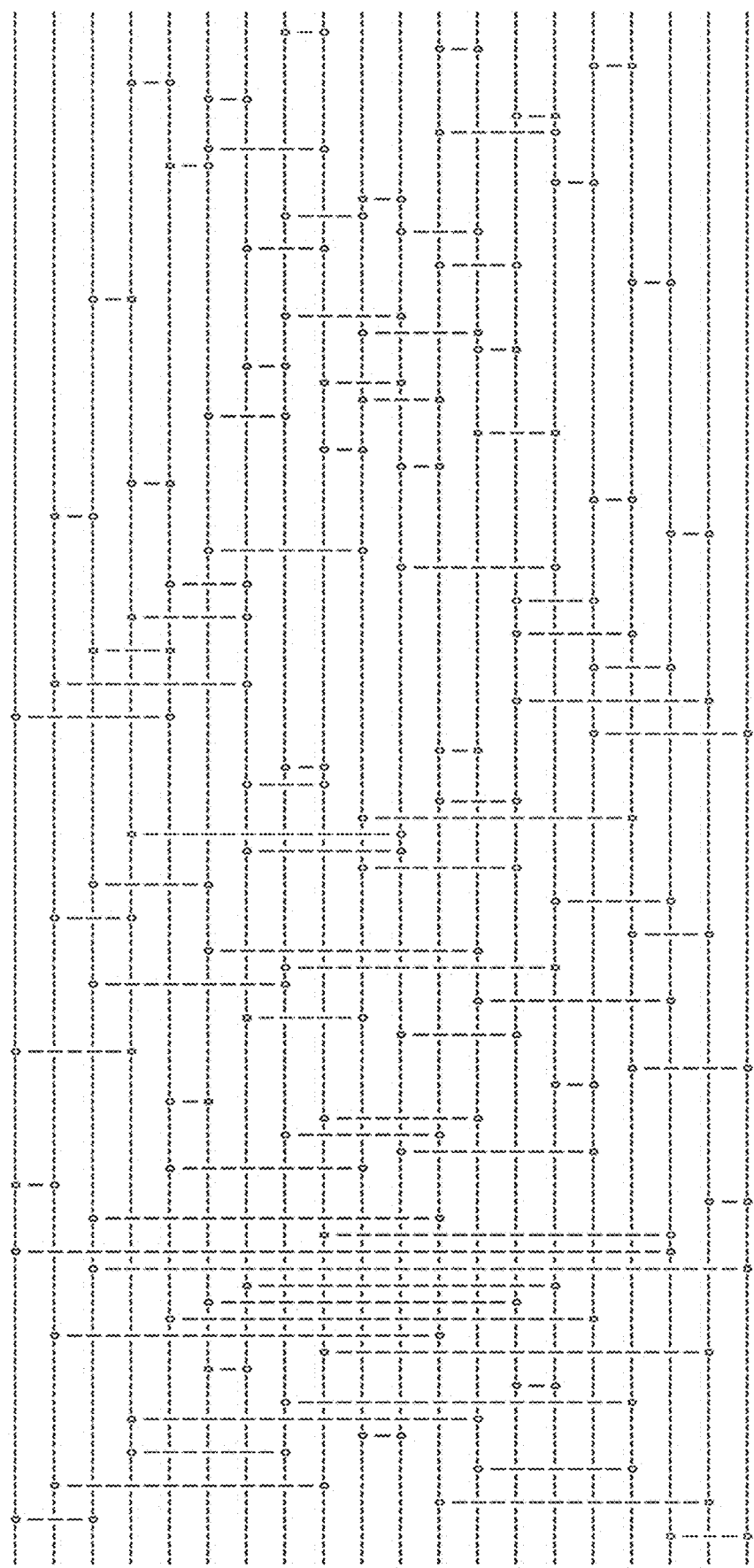
FIG. 7 illustrates the world record result for the sorting network domain problem resulting from implementation of the Composite Novelty Pulsation method described in the embodiments herein.

Implementation of the Composite Novelty Pulsation method on the sorting network problem resulted in a world record. FIG. 7 shows the world recording breaking graph for a 20-line sorting network, which moved the previous record of 92 comparators down to 91. The record breaking implementation ran on a single machine with 16 CPU cores; a pool size of only 30 individuals over the course of a couple of months and over a million generations. Like the present experiments, Novelty Pulsation was 5:1 and the Novelty Selection multiplier was 2.

The Composite Novelty Pulsation process was also applied to a problem in the stock trading domain. Stock trading is a natural multi-objective domain where return and risk must be balanced. Candidate solutions, i.e. trading agents, can be represented in several ways. Rule-based strategies, sequence modeling with neural networks and LSTMs (Long Short-Term Memory), and symbolic regression using Genetic Programming or Grammatical Evolution are common approaches. Frequency of trade, fundamental versus technical indicators, choice of trading instruments, transaction costs, and vocabulary of order types are crucial design decisions in building such agents.

Figure 8:
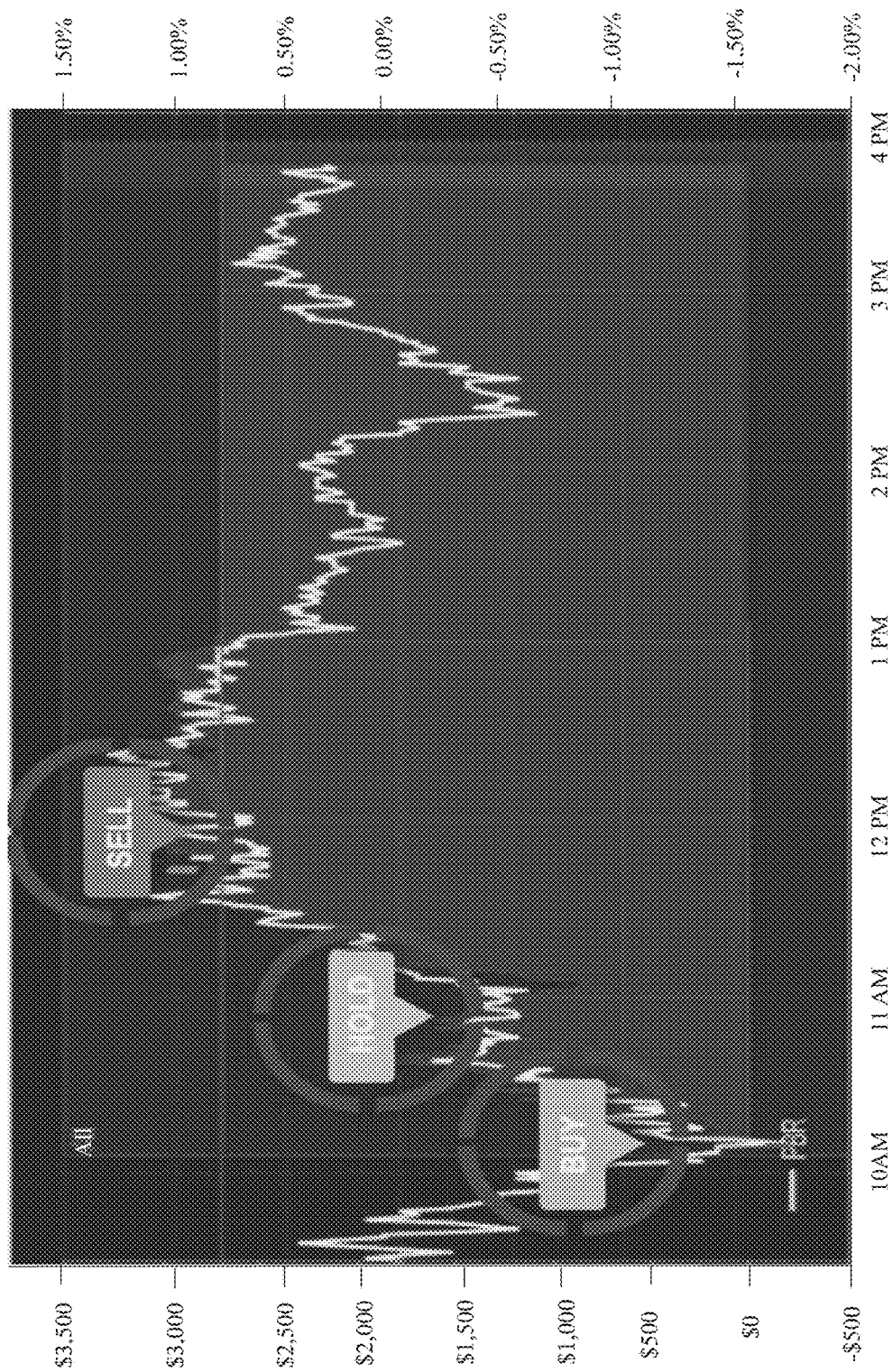
FIG. 8 exemplifies historical time-series data on stock prices which may be used as input to the embodiments described herein extract useful patterns to make optimal trading decisions.

The goal is to extract patterns from historical time-series data on stock prices and utilize those patterns to make optimal trading decisions, i.e. whether to buy, hold, or sell particular stocks (FIG. 8). The main challenge is to trade in a manner that generalizes to previously unseen situations in live trading. Some general methods like training data interleaving can be used to increase generalization, but the effectiveness of these approaches might not be enough due to the low signal to noise ratio which is the main source of deception in this domain. The data is extremely noisy and prone to overfitting. Methods that discover more robust decisions (solutions) are needed. In the stock market domain experiment, generalization was compared as between the Composite Novelty Selection and Composite Novelty Pulsation processes by measuring the correlation between seen and unseen data. The experimental parameters in the trading domain experiment are in Table 2.

TABLE 2

| | |
|---|---|
| Number of Runs | 10 runs on 5 years of historical data |
| Parent Selection Rate | 10% |
| Population Size | 500 |
| Number of Generations | 100 |
| Novelty Selection multiplier (m) | 2 |
| Novelty Pulsation (P) | 5:1 (P = 5) |

At the end of the ten runs, we pick 10 best individuals from each run (10×10=100 total), then we compared their performance on the 5 years of historical data (training data) to their performance on the consequent unseen year. (i.e. 2008-2012 was training data and the 2013 was withheld).

Figure 9:
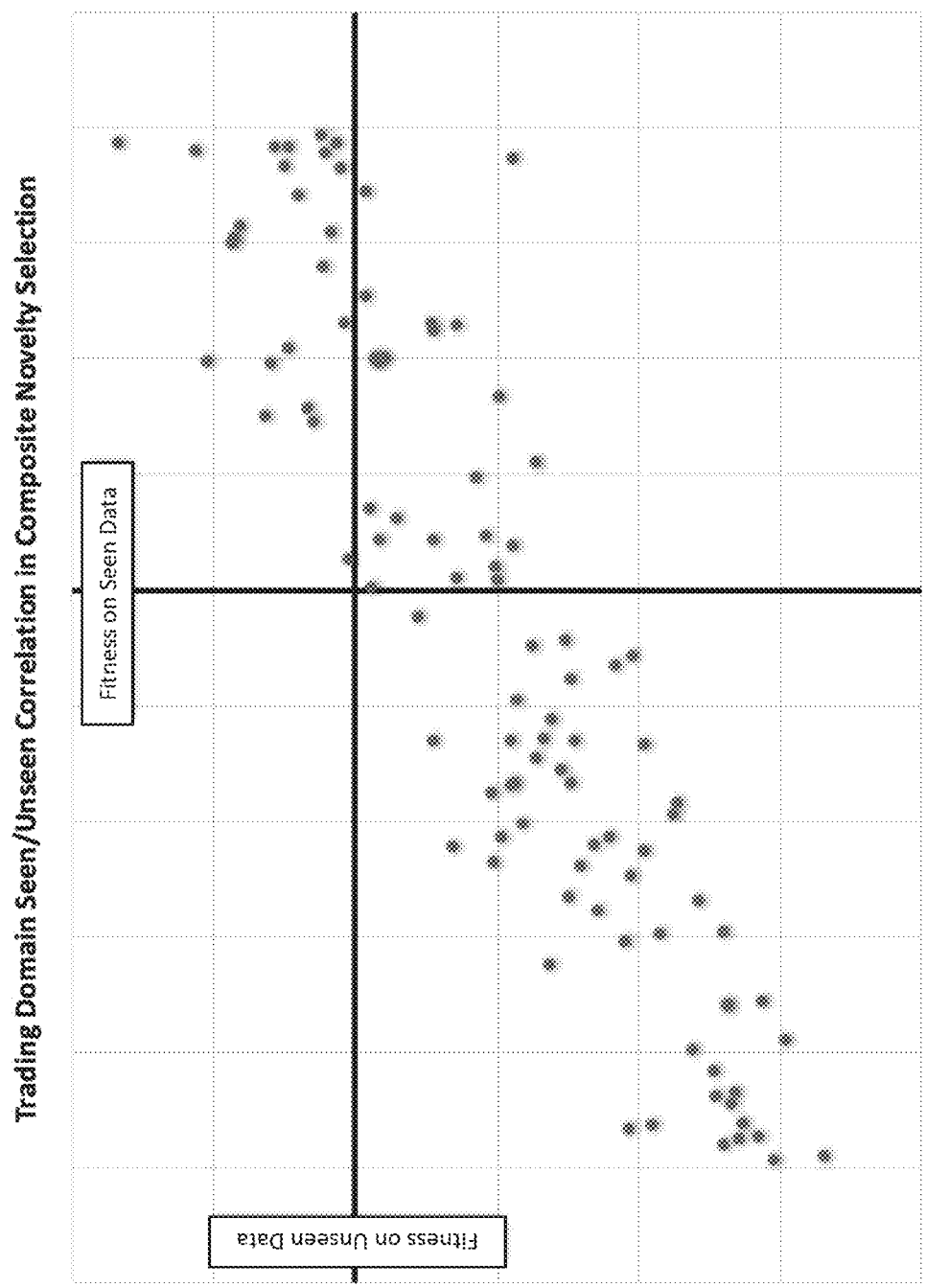
FIG. 9 illustrates a generalization of the Composite Novelty Selection method as applied to the training domain example.
Figure 10:
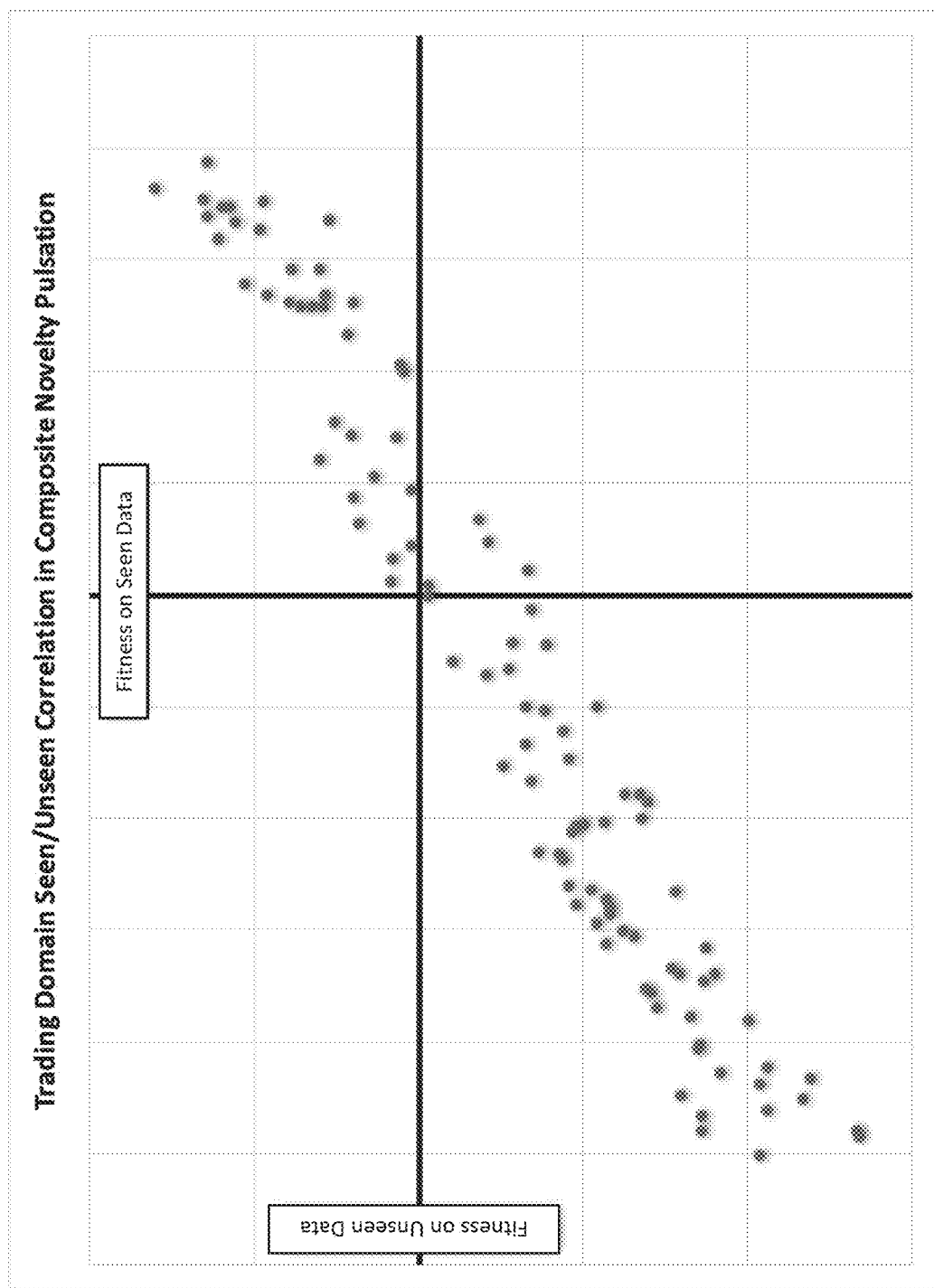
FIG. 10 illustrates a generalization of the Composite Novelty Pulsation methods as applied to the trading domain example.

FIGS. 9 and 10 illustrate generalization of the Composite Novelty Selection and Composite Novelty Pulsation methods, respectively. In both figures, The fitness on seen data is on the x-axis and fitness on unseen data is on the y-axis. Candidates to the right of the vertical line are profitable on seen data, and candidates above the horizontal line are profitable on unseen data.

Points in FIG. 10 are noticeably closer to a diagonal line, which means that better training fitness resulted in better testing fitness, i.e. higher correlation and better generalization. Numerically, the seen-to-unseen correlation for the Composite Novelty Selection method is 0.69, while for Composite Novelty Pulsation, it is 0.86. The ratio of the number of profitable candidates on unseen data and training data is also better, suggesting that underfitting is unlikely. In practice, these differences are significant, translating to much improved profitability in live trading.

The stock trading experiment was designed to demonstrate that the Composite Novelty Pulsation approach makes a difference in real-world problems. The main challenge in trading is generalization to unseen data, and indeed in this respect, Composite Novelty Pulsation improved generalization significantly.

The methods described herein must be implemented on one or more processing systems. The types and scale of the available processing system components, including one or more processing units, servers, memory components, databases, and the like are known to those skilled in the art and trade-offs between power and efficiency in accordance with application of the disclosed methods are within the considerations one skilled in the art would weigh in selecting particular processing system components. Exemplary processing systems which may be considered for implementation of one or more disclosed processes are described in previously referenced U.S. patent application Ser. No. 16/268,463, which is incorporated herein by reference. The MOEAs as discussed and exemplified herein and applied to exemplary domains and problems are inextricably tied to computer processing and exist as specially programmed machines. The MOEAs described herein improve upon existing MOEAs by transforming inputs into superior optimal solutions with improved efficiency and results.

The following schematics and flow charts are general representations of the systems and methods described herein, but are in no way intended to be limiting.

Figure 11:
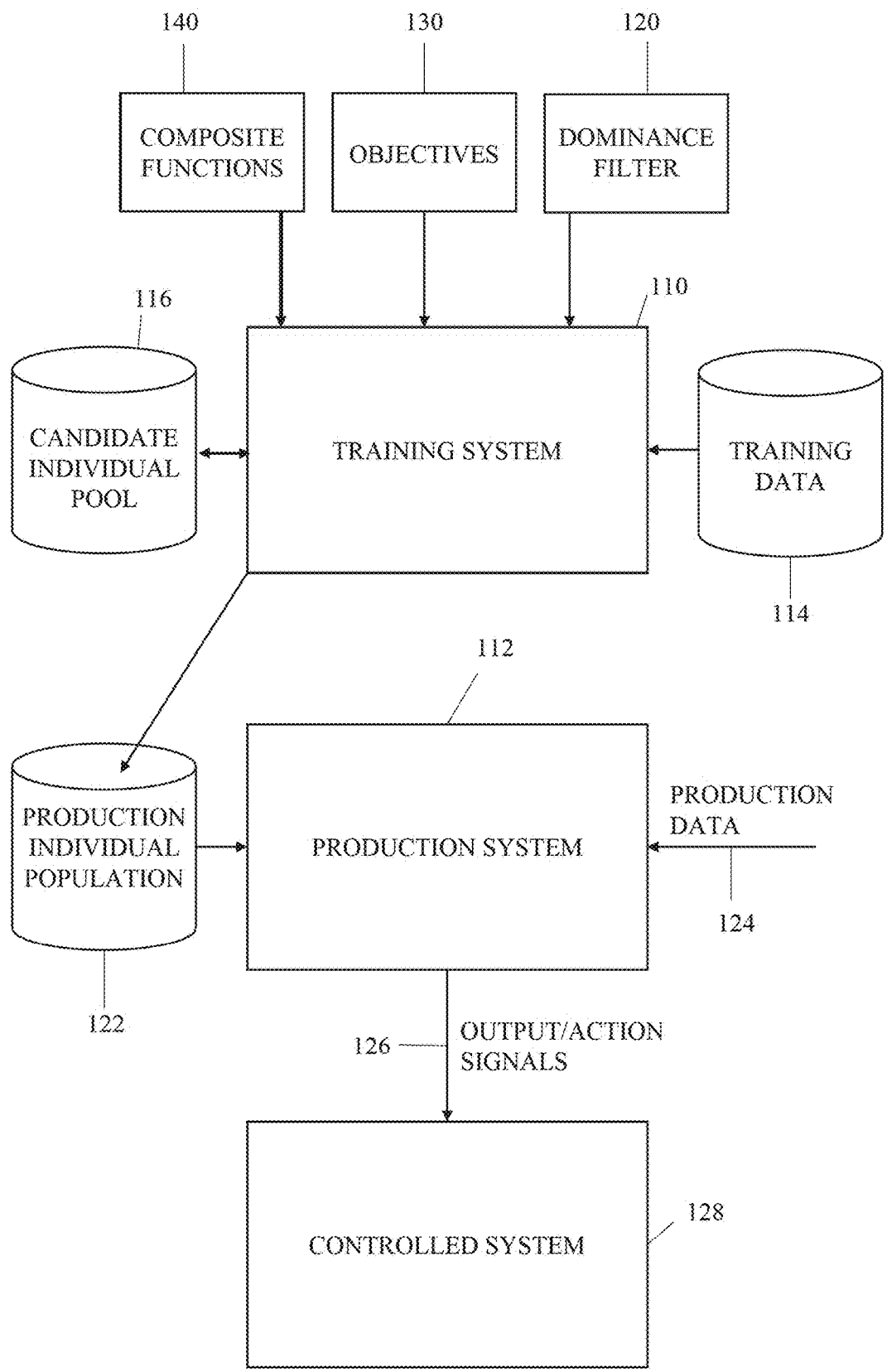
FIG. 11 illustrates and exemplary training system which can be used to implement the functionality of the embodiments described herein.

FIG. 11 is an overall diagram of an embodiment of a data mining system incorporating features of the invention. The system is divided into three portions, a training system 110, a production system 112, and a controlled system 128. The training system 110 interacts with at least one database 114 containing training data, as well as with at least another database 116 containing the candidate individual pool. The training system 110 operates according to a plurality of composite functions 140, which indicate to the training system 110 how to measure the composite values of an individual. The plurality of composite functions 140 also defines the search space for individuals with respect to the multiple objectives 130 in the data mining environment. The training system 110 attempts to optimize for individuals that have the greatest dominance over other individuals in the defined search space. Whether a certain individual dominates over other is determined by a specified dominance filter 120.

The production system 112 operates according to a production individual population in another database 122. The production system 112 applies these individuals to production data 124, and produces outputs 126, which may be action signals or recommendations. In the stock trading domain, the production data 124 may be current, real-time or near-real-time stock trading data, and the outputs 126 of the production system 112 may be a suggested buy, hold, sell recommendations that one or more of the individuals in production individual population 122 outputs in response to the production data 124. The production individual population 122 is harvested from the training system 110 once or at intervals, depending on the embodiment.

The controlled system 128 is a system that is controlled automatically by the signals 126 from the production system. Depending on the application environment, the controlled system 128 may include mechanical systems such as engines, air-conditioners, refrigerators, electric motors, robots, milling equipment, construction equipment, or a manufacturing plant, or other computer systems, or an output display to inform a user of a recommendation (e.g., buy, hold sell in the stock trading domain) or diagnosis. One skilled in the art recognizes that the controlled system 128 may take virtually any form in accordance with the intended domain.

While the embodiment of FIG. 11 operates the training system separately from the production system, aspects of the invention also apply to so-called "online" learning systems in which the training system and the production system are one. That is, training is performed on actual production data, and the outputs of the candidate individuals are actually used to operate the controlled system 128, even though the candidate individuals may not yet have been fully vetted. Candidate individuals are evaluated on actual feedback from the use of their outputs by the controlled system 128. Such a system may never harvest individuals for use in production because they are already being used in production.

In one embodiment, the individuals in candidate pool 116 are stored and managed by conventional database management systems (DBMS), and are accessed using SQL statements. New individuals can be inserted into the candidate pool 116 using the SQL "insert" statement, and individuals being discarded can be deleted using the SQL "delete" statement. In another embodiment, the individuals in candidate pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list. Discarding causes an individual to be removed from competition, but in some embodiments, information about the individual may be recorded or logged for other purposes.

As used herein, an "individual" created by procreation is considered herein to constitute a different individual than its parents, even though it retains some of its parents' genetic material. Individuals may be assigned and identified in accordance with an identifier ID value. Individuals in the candidate individual pool 116 also include information identifying the individual's objective values individually or, in a composite objective embodiment, the composite values for each composite function defined for the multi-objective data mining environment. Some embodiments may also define a single overall fitness estimate for each individual, and that value, too, may be stored as part of the individual.

Individuals also include one or more "rules", each of which contains one or more conditions and an output to be asserted if all the conditions in a given sample are true. During procreation, any of the conditions or any of the outputs may be altered, or even entire rules may be replaced. As used herein, a "result" of an individual is the combination of outputs produced by an individual in response to a single data sample (either during training or in production), and the "performance" of an individual with respect to an objective is a measure of how well the "result" satisfied that objective on that single sample.

A rule is a conjunctive list of conditions in association with an output. For example, if the individual's conditions are all specified as parameter/value ("P/V") pairs and the rule specifying a particular value (or range of values) for the parameter is met, then the condition is true. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent to those skilled in the art.

The training data is arranged in the database 114 as a set of samples, each with parameters and their values, as well as sufficient information to determine a result that can be compared with an assertion made by an individual on the values in the sample. In one embodiment, the output is explicit, for example, a number set out explicitly in association with the sample. In such an embodiment, the objective values can be dependent upon the number of samples for which the individual's output matches the result of the sample. In another embodiment, the result may not be present in the test data itself, but rather derivable from the test data. In alternative to individuals being expressed in terms of rules, an individual might, for example, be expressed in terms of a vector of floating point numbers. Many other embodiments will be apparent to those skilled in the art. In general, as used herein, individuals merely identify a potential solution to the problem provided to the system for solving.

Figure 12:
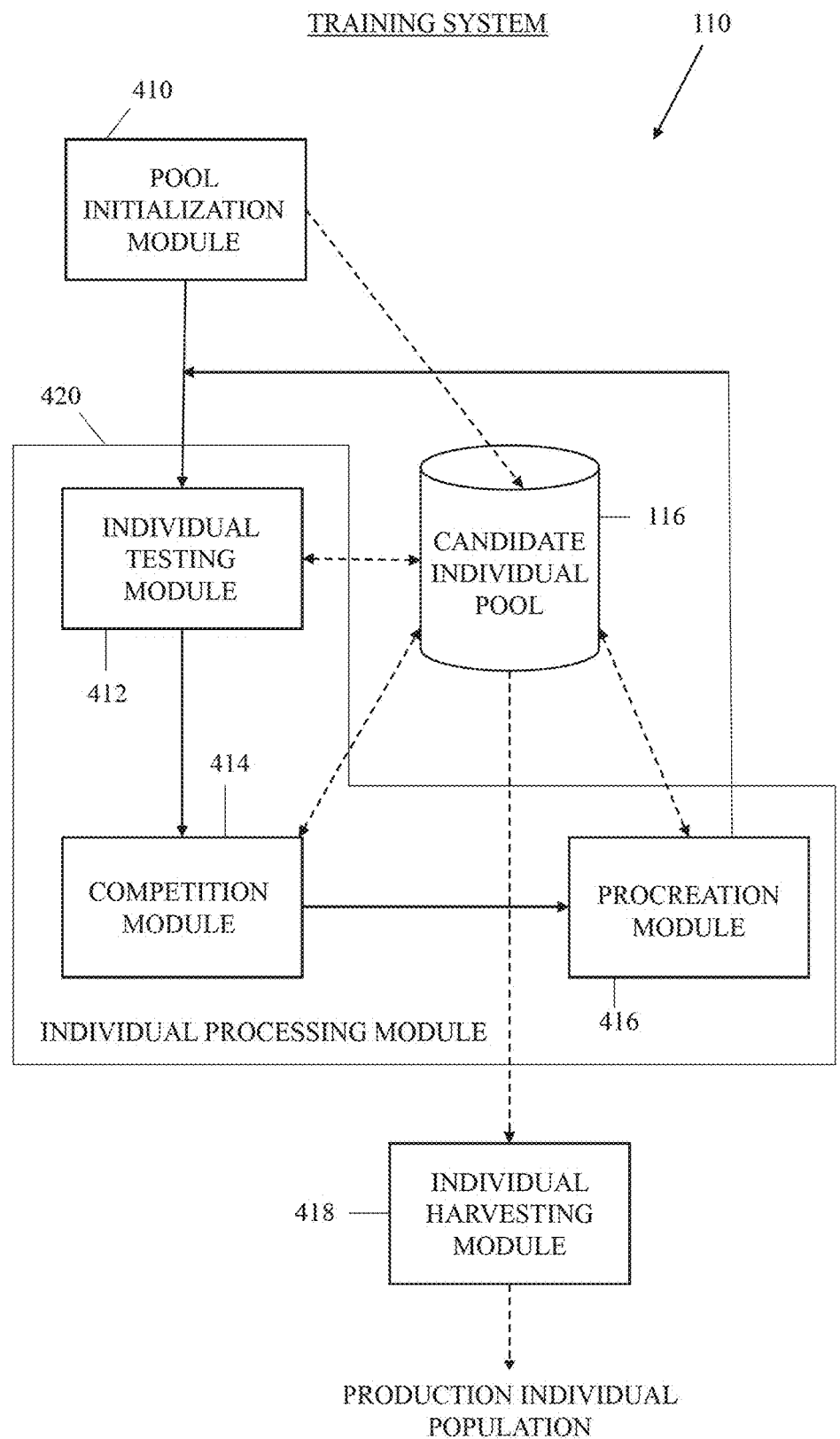
FIG. 12 illustrates various modules that can be used to implement the functionality of the exemplary training system of FIG. 11.

FIG. 12 illustrates various modules that can be used to implement the functionality of training system 110 (FIG. 11). Candidate individual pool 116 is also shown in the drawing. Solid lines indicate process flow, and broken lines indicate data flow. The modules can be implemented in hardware or software, and need not be divided up in precisely the same blocks as shown in FIG. 12. Some can also be implemented on different processors or computers or spread among a number of different processors or computers. In addition, it will be appreciated that some of the modules can be combined, operated in parallel or in a different sequence than that shown in FIG. 12 without affecting the functions achieved. Also as used herein, the term "module" can include "sub-modules," which themselves can be considered herein to constitute modules. In particular, the individual testing module 412, competition module 414, and procreation module 416 are also considered herein to be sub-modules of an individual pool processor module 420. The blocks in FIG. 13 designated as modules can also be thought of as flowchart steps in a method.

Referring to FIG. 12, the candidate individual pool 116 is initialized by pool initialization module 410, which creates an initial set of candidate individuals in the individual pool 116. These individuals can be created randomly, or in some embodiments, a priori knowledge is used to seed the first generation. At the start, all individuals are initialized with objective values and composite values that are undefined.

Individual testing module 412 then proceeds to test the population in the individual pool 116 on the training data 114. Only a subset of the population in the individual pool 116 is tested at this point. As used herein, the term "subset,"

unless otherwise qualified, includes both proper and improper subsets as well as the null set. Each individual in the subset undergoes a battery of tests or trials on the training data 114, each trial testing the individual on one sample 310. In one embodiment, each battery might consist of only a single trial. Preferably, however, a battery of tests is much larger, for example on the order of 1000 trials. Note there is no requirement that all individuals undergo the same number of trials. Note also that in an online learning embodiment, "testing" of an individual may involve using the individual to control the controlled system 128, and receiving any resulting feedback.

After the tests, the individual testing module 412 updates the objective values associated with each of the objectives and the composite values for each of the composite functions for the individuals tested. In an embodiment, each of the objective values may be an average of the results of all trials of the individual for the specific objective. In an embodiment, each of the composite values may be an average of the corresponding composite function values based on the results of all trials of the individual. In an embodiment, each of the composite values may be calculated as the corresponding composite function evaluated at the individual's average objective values.

Once the objective values and composite values are updated in the candidate individual pool for each tested individual, the competition module 414 performs competition among individuals and may discard some individuals, leaving an elitist pool of candidate individuals. More detail about the competition process is provided below. After the candidate individual pool 116 has been updated, a procreation module 416 selects from the elitist pool a random subset of individuals from which to evolve new individuals. Any conventional or future-developed technique can be used for procreation. In an embodiment, conditions, outputs, or rules from parent individuals are combined in various ways to form child individuals, and then, occasionally, they are mutated. The combination process, for example, may include crossover—i.e., exchanging conditions, outputs, or entire rules between parent individuals to form child individuals. New individuals created through procreation begin with objective values and composite values that are undefined (i.e. indicate that they have not yet been assigned). These individuals are placed in the individual pool 116. Preferably, after new individuals are created by combination and/or mutation, the parent individuals are retained. In this case, the parent individuals also retain their objective values and composite values. In another embodiment, the parent individuals are discarded.

After procreation, individual testing module 412 operates again on the updated individual pool 116. The process continues repeatedly.

Individuals can be harvested for use by production system 112. Individual harvesting module 418 retrieves individuals for that purpose. In one embodiment, individual harvesting module 418 retrieves individuals periodically, whereas in another embodiment it retrieves individuals only in response to user input. Individual harvesting module 418 can apply certain selection criteria as well in order to choose desirable individuals. For example, in one embodiment it selects only individuals that are not dominated by any other individuals in the pool. The individuals may also undergo further validation as part of this further selection process, by testing on historical data not part of training data 114. The individuals selected by the individual harvesting module 418 are written to the production individual population database for use by production system 112 as previously described. In an online learning embodiment, there may be no separate harvesting module since the candidate individuals essentially are already in production.

The competition module 414 utilizes the dominance filter 120 to select a first set of individuals. In one embodiment, the competition module 414 may select all individuals currently in the candidate pool 116, to be included in the first set of individuals. In another embodiment, the competition module 414 may select a predetermined number of individuals currently in the candidate pool 116 to be included in the first set of individuals. The competition module 414 may then select a final set of individuals from the first set of individuals in dependence upon relative novelty and/or relative diversity among the individuals in the first set of individuals. As discussed above and further herein below, the relative novelty factor is not used during every procreation generation, but instead is turned on every P generations.

In one embodiment, any individual not included in the final set of individuals is discarded from the candidate individual pool 116. The individual processing module 420 uses the final set of individuals for procreating new individuals and adding them to the pool of candidate individuals.

Figure 13A:
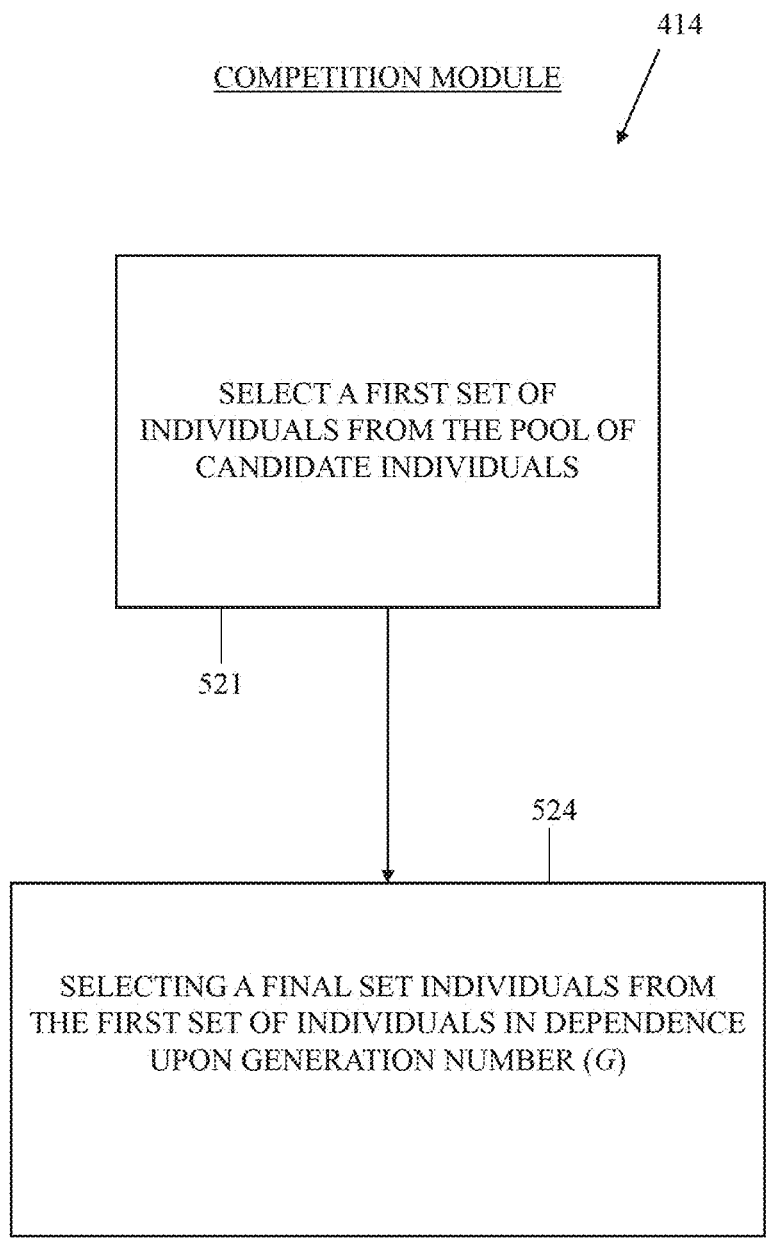
FIGS. 13a, 13b and 13c illustrate a method of operation of a competition module in accordance with the Composite Novelty Pulsation process of the present embodiments.f
Figure 13B:
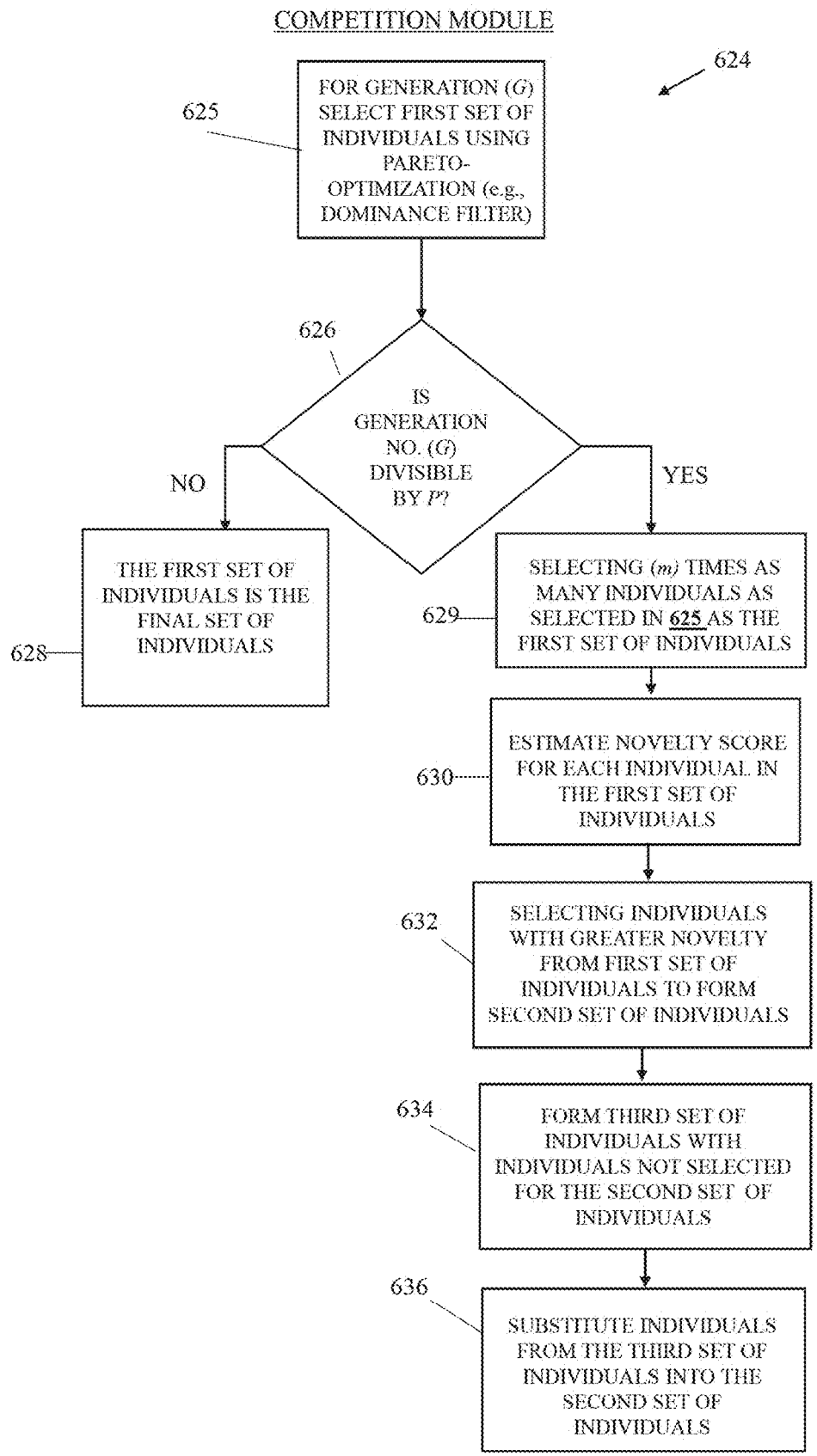
Figure 13C:
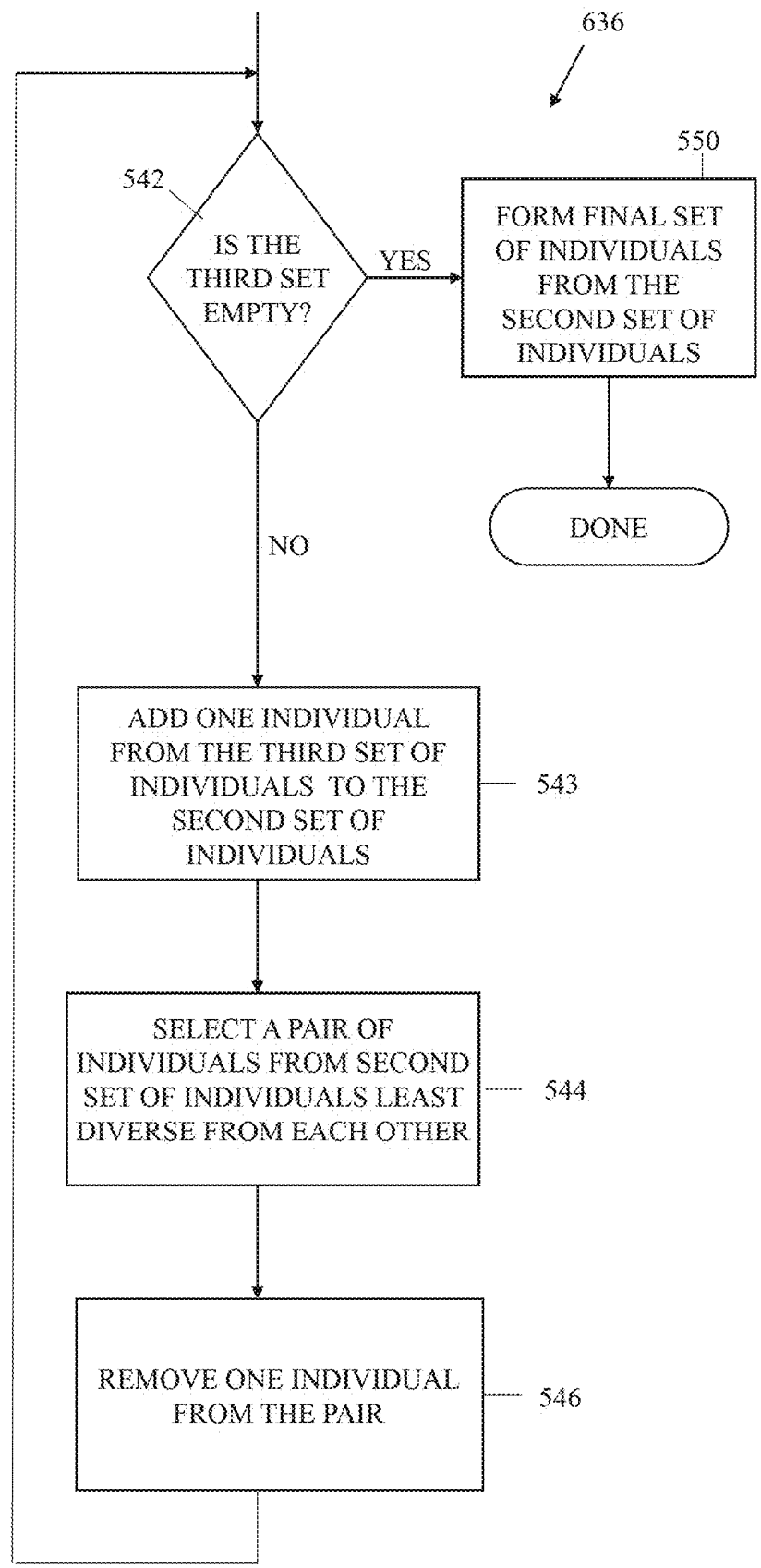

FIGS. 13a, 13b and 13c illustrate a method of operation of competition module 414 in accordance with the Composite Novelty Pulsation process described herein. In these embodiments, the competition module 414 selects individuals from the candidate individual pool 116 to be included in the first set of individuals by using a dominance filter at step 521. These executions of competition module 414 are sometimes referred to herein as competition "events," and each comparison made between the dominance estimate of one individual and that of another by the dominance filter is sometimes referred to herein as a comparison "instance." As compared to a conventional multi-objective search, the optimization of composite functions instead of raw objective values tends to favor individuals for the first set of individuals that are in a focused area of objective space (a multi-dimensional space in which each orthogonal axis represents a different one of the objectives). Overall diversity of behavior among the individuals in the first set of individuals may be reduced, however.

More specifically, it will be appreciated that different individuals, even if they have the same objective values (i.e. occupy the same position in objective space), might exhibit entirely different behavior in reaching those objective values. For example, if an objective of the search is the time that a robot requires to reach a destination, then two individuals might cause the robot to reach the destination in the same amount of time. But one may achieve that time by causing the robot to take many short steps, whereas the other may achieve that time by causing the robot to take fewer long steps. These two individuals can be said to have a certain amount of diversity in behavior, even if not in fitness. To evaluate diversity of behavior, a "behavior space" may be defined in which multiple aspects of an individual's behavior are identified, and each aspect is represented in behavior space by a respective orthogonal axis. An individual's location in behavior space then is given by the vector of its values in each of the behavioral aspects. It can thus be appreciated that even if a set of individuals appear diverse in objective space, they may lack diversity in behavior space, or vice-versa.

Referring to FIG. 13b, dependent upon the generation (G) number, the first set of individuals is the final set of individuals, the elitists, which are determined using a Pareto-optimization process (e.g., dominance filtering), and which proceed to the procreation module. Alternatively, and also dependent upon the generation (G) number, the process continues in an effort to ensure diversity in behavior space. Thus, in step 524, the competition module 414 selects a final set of individuals from the first set of individuals after a series of additional steps. The final set of individuals is generally smaller than the first set of individuals. Diversity in behavior can be encouraged in the focused area of search by utilizing a relative novelty measure and/or a relative diversity measure among the individuals in the first set of individuals to select the final set of individuals. As discussed above, implementation of a novelty selection process is used in the procreation process every P generations, i.e., when G=P. In step 524, the competition module 414 can further discard from the candidate individual pool all individuals in the pool that are not in the final set of individuals. Therefore, after discarding, the candidate individual pool contains the individuals from the final set of individuals.

In one embodiment, selection of the first set of individuals in module 521 uses Pareto-optimization. The module selects individuals from the candidate individual pool that are not dominated by any other individuals in the pool to form the first set of individuals. In another embodiment, the competition module 414 may select a predetermined number of individuals from the candidate individual pool, such that the individuals not present in the first set of individuals have the least dominance over the individuals in the first set of individuals. In order to determine whether an individual is dominated by other individuals in the pool of candidate individuals, the dominance of said individual over every other individual in the candidate individual pool is evaluated. A first individual in the pool dominates over a second individual in the pool if the composite value of the first individual is greater than composite value of the second individual for at least one corresponding composite function, and the composite value of the first individual is not lower than composite value of the second individual for any other composite functions. For example, an individual x has composites values of 23, 44 and 20 for composite functions 1, 2 and 3 respectively, while an individual y has composite values of 10, 10 and 10. Individual x clearly dominates individual y as individual x has higher composite values than individual y for all three composite functions. If individual y has composites values of 23, 34 and 20 for composite functions 1, 2 and 3 respectively, individual x still dominates individual y as individual x has a higher composite value than individual y for at least one composite function (composite function 2), while the composite values of individual x for the other two composite functions (composite function 1 and composite function 3) are not lower than composite value of individual y for those two composite functions. If individual y has composites values of 23, 54 and 5 for composite functions 1, 2 and 3 respectively, individual x no longer dominates individual y even though individual x has a higher composite value than individual y for at least one composite function (composite function 3). The composite value of individual x for composite function 2 is lower than the composite value of individual y for the corresponding composite functions. Some methods to perform Pareto-optimization are described in the above-incorporated NSGA-II paper.

FIG. 13*b* illustrates a method by which the competition module 414 selects a final set of individuals from the first set of individuals in dependence upon generation (G) number. That is, after selecting a first set of individuals using a dominance filtering process 625, if G=P, wherein P is a predetermined number 626, then a process for determining relative novelty and/or relative diversity among the individuals in the first set is applied. First, at step 629, the process expands the number of individuals in the first set of individuals by a multiplier $n_2>1$ ($n_2=2$ in the experiments herein). Next, at step 630, the competition module 414 estimates the novelty score for each individual in the first set of individuals. In an embodiment, when individuals from the candidate individual pool are tested against a portion of the training data, a behavioral value of the individual is identified. As used herein, a behavioral value b(x) of an individual x in a data mining environment is a vector or a scalar number resulting from the evaluation of the individual in the data mining environment, according to a predefined measure of its behavior. For example, for an n-line sorting network, the predetermined measure of behavior may be a vector of size n, when each element 'i' is the number of times the i-th line of the sorting network would switch, when applying the network to all 2^n possible combinations. For stock market domain, this measure could be the pairwise correlation of the two individual signals. In other words, the predetermined measure of the behavior of an individual captures a space that is expected to have practical benefits. As used herein, a behavior difference d(b(x),b(y)) between an individual x and an individual y is the distance between two individuals in the behavior space. The novelty score of an individual $x_i$ can be estimated by summing the pairwise distance of its behavior vector to that of all the other individuals in the first set of individuals. Therefore, for the first set of individuals with n individuals, the average novelty score of individual $x_i$ is estimated by Equation 6:

$$NoveltyScore(x_i) = \sum_{j=1}^{n} d(b(x_i), b(x_j)).$$

At step 632, the competition module 414 selects a predetermined number of individuals with greater novelty from the first set of individuals to form the second set of individuals. In some embodiments, individuals with the highest novelty score in the first set of individuals are selected to form the second set of individuals.

It is possible that step 632 may result in a cluster of solutions that are far from the rest of the crowd in behavior space, because they all have high novelty scores when compared to the others. Though not necessary in all embodiments, it might be good enough to keep only one representative from that behavioral cluster. In order to address this issue, at step 634, the competition module 414 forms a third set of individuals with the individuals in the first set of individuals not included in the second set of individuals. At step 636 the competition module 414 then substitutes individuals from the third set of individuals into the second set of individuals, one by one, in a manner that improves the behavioral diversity of the individuals in the second set of individuals, to form the final set of individuals.

FIG. 13*c* illustrates a method by which the competition module 414 substitutes individuals from the third set of individuals into the second set of individuals in a manner that improves the behavioral diversity of the individuals in the second set of individuals. At step 542, it is first determined whether the third set of individuals is empty. If not, then at step 543, the competition module 414 adds an individual from the third set of individuals to the second set of individuals, thereby reducing the size of the third set of individuals by one and increasing the size of the second set by one. At step 544, two individuals are selected from the second (now enlarged) set of individuals that have the smallest behavior difference. At step 546, one of these individuals is retained in the second set of individuals while the other is discarded. In one embodiment, the dominance filter 120 may be used to determine which individual among the two selected individuals dominate over the other. In another embodiment, overall fitness estimates of the two selected individuals may be used in order to choose which individual to discard. The individual with the lower fitness estimate is discarded. Obviously, many modifications and variations of filters will be apparent to practitioners skilled in this art that can be used to discard one individual from the two selected individuals. Discarding one of the individuals from the two individuals with the smallest behavior difference and adding an individual from the third set of individuals to the second set of individuals improves the diversity of individuals in the second set of individuals.

The procedure then returns to step 542, where it is again determined whether the size of the third set of individuals is zero. If yes, then the final set of individuals is formed from the second set of individuals. It can be seen that the combined procedures of FIGS. 13a, 13b, and 13c add to the formation of the final set of individuals by the competition module 414.

Note that whereas in FIG. 13c, an individual is added from the third subset into the second subset (step 543) before steps 544 and 546 remove an individual from a least diverse pair in the second set. In another embodiment, steps 544 and 546 may remove an individual from a least diverse pair in the second set before an individual is added from the third subset into the second subset. Other variations will be apparent. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

The Composite Novelty Pulsation method can also be applied in many other domains, in particular those that are deceptive and have natural secondary objectives. For instance, various game strategies from board to video games can be cast in this form, where winning is accompanied by different dimensions of the score. Solutions for many design problems, such as 3D printed objects, need to satisfy a set of functional requirements, but also maximize strength and minimize material. Effective control of robotic systems need to accomplish a goal while minimizing energy and wear and tear. Thus, many applications should be amenable to the composite novelty pulsation approach. Another direction is to extend the method further into discovering effective collections of solutions. For instance, ensembling is a good approach for increasing the performance of machine learning systems. Usually, the ensemble is formed from solutions with different initialization or training, but with no mechanism to ensure that their differences are useful. In Composite Novelty Pulsation, the Pareto front consists of a diverse set of solutions that span the area of useful tradeoffs. Such collections should make for a powerful ensemble, extending the applicability of the approach further. Composite Novelty Pulsation can increase the power and speed of multi-objective evolution.

The invention claimed is:

1. A computer-implemented method for finding a solution to a provided problem which optimizes a plurality of objectives and operates a controlled system using the found solution, comprising the steps of:
providing a computer system having a memory storing a candidate pool database identifying a pool of candidate individuals, each identifying a respective candidate solution to the provided problem;
testing, by the computer system, individuals from the pool of candidate individuals against a portion of training data to develop a plurality of objective values for each of the tested individuals, each of the objective values estimating the individual's level of success with respect to a corresponding one of the objectives;
selecting, by a predefined dominance filter of the computer system, a first subset of individuals from the candidate pool database, the dominance filter being dependent upon a plurality of composite functions of the objectives, each of the composite functions being dependent on at least one of the objectives and at least one of the composite functions being dependent on more than one of the objectives;
procreating, by the computer system, new individuals from one or more of the individuals in the first subset of the individuals selected by the dominance filter;
inserting the new individuals into the candidate pool database and repeating the steps of testing, selecting and procreating, wherein each iteration of the testing, selecting and procreation is a generation G until a predetermined end point is achieved;
further wherein, every P generations, wherein P=G, after the step of selecting a first subset of the individuals, selecting a second subset of individuals from the first subset of individuals, and selecting from the second subset a predetermined number of individuals having greater average behavioral novelty among the individuals in the first subset of individuals, than the average behavioral novelty of all others of the individuals from the first subset, and inserting the predetermined number of individuals selected from the second subset into the candidate pool database and repeating the steps of testing, selecting and procreating, wherein each iteration of the testing, selecting and procreation is a generation G until a predetermined end point is achieved; and
operating a controlled system in dependence upon at least one of the individuals from the candidate pool database when the predetermined end point is achieved.

2. The computer-implemented method of claim 1, wherein P≥2.

3. The computer-implemented method of claim 1, wherein selecting a second subset of individuals from the first subset of individuals includes:
re-selecting the first subset of individuals to include an expanded number of individuals in accordance with a multiplier m, wherein m is greater than 1;
determining a novelty score for each of the individuals in the expanded first subset;
sorting the individuals in the expanded first subset in descending order of novelty score;

selecting a predetermined number of sorted individuals to establish a result set, wherein the individual from the expanded first subset with the highest novelty score is selected first;

adding each non-selected, sorted individual from the expanded first subset one at a time to the result set and selecting for removal from the result set an individual having a lowest minimum novelty; and returning a final result set after each non-selected, sorted individual has been iteratively added and compared.

4. The computer-implemented method of claim 3, wherein the novelty score is determined as follows:

$$NoveltyScore(x_i) = \sum_{j=1}^{n} d(b(x_i), b(x_j))$$

wherein $b(x_i)$ is a function mapping any solution $x_i$ to its behavior $b_{xi}$, and $d(b(x_i), b(x_j))$ is a behavior distance wherein $x_j$ is the $j^{th}$ nearest neighbor of $x_i$ in a behavior space.

5. The computer-implemented method of claim 4, wherein minimum novelty is determined as follows:

$$MinimumNovelty(x_i) = \min_{1 \leq j \leq n; j \neq i} d(b(x_i), b(x_j)).$$

6. The method of claim 1, wherein using a predefined dominance filter to select a first subset of individuals from the candidate pool database comprises selecting from the first subset of individuals, individuals from the pool of candidate individuals that, in accordance with the predefined dominance filter, are not dominated by any other individuals in the pool.

7. The method of claim 6, wherein the predefined dominance filter is defined such that a first individual dominates over a second individual if and only if
(a) a composite value of the first individual is better than a composite value of the second individual for at least one of the composite functions and
(b) for all others of the composite functions, the composite value of the first individual is not worse than the composite value of the second individual.

8. The computer-implemented method of claim 1, wherein the provided problem is in one of the following domains: gaming strategies, 3D printing, stock trading, and robotics systems.

9. The computer-implemented method of claim 1, wherein the controlled system is selected from the group consisting of a specially programmed processor for implementing a gaming strategy, a 3D printer, a specially programmed processor for implementing a stock trade, and a robotics system.

10. A computer-implemented method for finding one or more optimal solutions to a predetermined problem and operating a controlled system using the one or more found optimal solutions, wherein the one or more optimal solutions addresses a plurality of objectives, comprising:

testing by a first computer-implemented program each of a plurality of candidate solutions from a predetermined pool of candidate solutions against a portion of training data to develop objective values for the plurality of objectives for each of the tested candidate solutions, each of the plurality of objective values estimating the candidate solution's level of success with respect to a corresponding one of the plurality of objectives;

selecting by a second computer-implemented program a first subset of candidate solutions from the candidate pool by application of a dominance filter, wherein a number of candidate solutions in the first subset is a predetermined number;

procreating, by a third computer-implemented program, new candidate solutions from one or more candidate solutions in the first subset of the candidate solutions selected by the dominance filter;

inserting the new candidate solutions into the candidate pool and repeating the steps of testing, selecting and procreating, wherein each iteration of the testing, selecting and procreation is a generation G until a predetermined end point is achieved;

further wherein, every P generations, wherein P=G, after the step of selecting a first subset of the candidate solutions, selecting by a fourth computer-implemented program, a second subset of candidate solutions from the first subset of candidate solutions, based on a novelty comparison, the selecting of the second subset including:

re-selecting the first subset of candidate solutions to include an expanded number of candidate solutions in accordance with a multiplier m times the predetermined number, wherein m is greater than 1;

determining a novelty score for each of the candidate solutions in the expanded first subset;

sorting the candidate solutions in the expanded first subset in descending order of novelty score;

selecting a predetermined number of sorted candidate solutions to establish a result set, wherein a candidate solution from the expanded first subset with the highest novelty score is selected first;

adding each non-selected, sorted candidate solution from the expanded first subset one at a time to the result set and selecting for removal from the result set a candidate solution having a lowest minimum novelty;

returning a final result set after each non-selected, sorted candidate solution has been iteratively added and compared; and inserting the final result set into the candidate pool database and repeating the steps of testing, selecting and procreating, wherein each iteration of the testing, selecting and procreation is a generation G until a predetermined end point is achieved; and operating a controlled system in dependence upon at least one of the candidate solutions from the final result set when the predetermined end point is achieved.

11. The computer-implemented method of claim 10, wherein P≥2.

12. The computer-implemented method of claim 10, wherein the novelty score is determined as follows:

$$NoveltyScore(x_i) = \sum_{j=1}^{n} d(b(x_i), b(x_j))$$

wherein $b(x_i)$ is a function mapping any solution $x_i$ to its behavior $b_{xi}$ and $d(b(x_i), b(x_j))$ is a behavior distance wherein $x_j$ is the $j^{th}$ nearest neighbor of $x_i$ in a behavior space.

13. The computer-implemented method of claim 12, wherein minimum novelty is determined as follows:

$$MinimumNovelty(x_i) = \min_{1 \le j \le n; j \ne i} d(b(x_i), b(x_j)).$$

14. The method of claim 10, wherein using a predefined dominance filter to select a first subset of candidate solutions from the candidate pool comprises selecting from the first subset of candidate solutions, candidate solutions from the pool of candidate solutions that, in accordance with the predefined dominance filter, are not dominated by any other individuals in the pool.

15. The method of claim 14, wherein the predefined dominance filter is defined such that a first candidate solution dominates over a second candidate solution if and only if
(a) a composite value of the first candidate solution is better than a composite value of the second candidate solution for at least one of the composite functions and
(b) for all others of the composite functions, the composite value of the first candidate solution is not worse than the composite value of the second candidate solution.

16. The computer-implemented method of claim 10, wherein the provided problem is in one of the following domains: gaming, 3D printing, stock trading, and robotics systems.

17. The computer-implemented method of claim 16, wherein the controlled system is selected from the group consisting of a specially programmed processor for implementing a gaming strategy, a 3D printer, a specially programmed processor for implementing a stock trade, and a robotics system.

18. The computer-implemented method of claim 10, wherein m≥2.

19. A computer-implemented method for finding a solution to a provided problem in a predetermined domain which optimizes a plurality of objectives and operating a controlled system using the found solution, comprising the steps of:
testing, by a specially programmed system, a set of candidate solutions selected from a candidate solutions pool against a portion of training data for the predetermined domain to develop objective values for each of the tested candidate solutions, each of the objective values estimating the tested candidate solution's level of success with respect to a corresponding one of the objectives;
selecting, by a dominance filter of the specially programmed system, a first subset of a predetermined number of candidate solutions from the set, wherein the dominance filter selects candidate solutions using comparisons between composite objective functions of each of the candidate solutions, the composite objective functions including one or more of the estimated objective values;
procreating, by the specially programmed system, new candidate solutions from one or more of the candidate solutions in the first subset of candidate solutions;
inserting the new candidate solutions into the candidate solutions pool and repeating the steps of testing, selecting and procreating, until a predetermined end point is achieved, wherein each iteration of the testing, selecting and procreation is a generation G;
further wherein, every P generations, wherein P=G, after the step of selecting a first subset of the candidate solutions, selecting a second subset of candidate solutions from the first subset of candidate solutions, based on a novelty comparison, and inserting the second subset of candidate solutions into the candidate solutions pool and repeating the steps of testing, selecting and procreating, wherein each iteration of the testing, selecting and procreation is a generation G until a predetermined end point is achieved; and
operating a controlled system in dependence upon at least one of the candidate solutions from the candidate pool database when the predetermined end point is achieved.

20. The computer-implemented method of claim 19, wherein P≥2.

21. The computer-implemented method of claim 19, wherein selecting a second subset of individuals from the first subset of individuals includes:
re-selecting the first subset of candidate solutions to include an expanded number of candidate solutions in accordance with a multiplier m times the predetermined number, wherein m is greater than 1;
determining a novelty score for each of the candidate solutions in the expanded first subset;
sorting the candidate solutions in the expanded first subset in descending order of novelty score;
selecting a predetermined number of sorted candidate solutions to establish a result set, wherein a candidate solution from the expanded first subset with the highest novelty score is selected first;
adding each non-selected, sorted candidate solution from the expanded first subset one at a time to the result set and selecting for removal from the result set a candidate solution having a lowest minimum novelty; and
returning a final result set after each non-selected, sorted candidate solution has been iteratively added and compared.

22. The computer-implemented method of claim 21, wherein the novelty score is determined as follows:

$$NoveltyScore(x_i) = \sum_{j=1}^{n} d(b(x_i), b(x_j))$$

wherein $b(x_i)$ is a function mapping any solution $x_i$ to its behavior $b_{xi}$ and $d(b(x_i), b(x_j))$ is a behavior distance wherein $x_j$ is the $j^{th}$ nearest neighbor of $x_i$ in a behavior space.

23. The computer-implemented method of claim 21, wherein minimum novelty is determined as follows:

$$MinimumNovelty(x_i) = \min_{1 \le j \le n; j \ne i} d(b(x_i), b(x_j)).$$

24. The computer-implemented method of claim 19, wherein the provided problem is in one of the following predetermined domains: gaming, 3D printing, stock trading, and robotics systems.

25. The computer-implemented method of claim 19, wherein the controlled system is selected from the group consisting of a specially programmed processor for implementing a gaming strategy, a 3D printer, a specially programmed processor for implementing a stock trade and a robotics system.

* * * * *